US 12,103,065 B2

(12) United States Patent
Hagiwara

(10) Patent No.: US 12,103,065 B2
(45) Date of Patent: Oct. 1, 2024

(54) STAKING ASSEMBLY MANUFACTURING METHOD, HUB UNIT BEARING MANUFACTURING METHOD, AND VEHICLE MANUFACTURING METHOD

(71) Applicant: NSK LTD., Tokyo (JP)

(72) Inventor: Nobuyuki Hagiwara, Fujisawa (JP)

(73) Assignee: NSK LTD., Tokyo (JP)

( * ) Notice: Subject to any disclaimer, the term of this patent is extended or adjusted under 35 U.S.C. 154(b) by 31 days.

(21) Appl. No.: 17/427,397

(22) PCT Filed: Feb. 20, 2020

(86) PCT No.: PCT/JP2020/006675
§ 371 (c)(1),
(2) Date: Jul. 30, 2021

(87) PCT Pub. No.: WO2020/208947
PCT Pub. Date: Oct. 15, 2020

(65) Prior Publication Data
US 2022/0143679 A1  May 12, 2022

(30) Foreign Application Priority Data
Apr. 10, 2019  (JP) ................. 2019-074550

(51) Int. Cl.
*B21J 9/02* (2006.01)
*B21K 1/40* (2006.01)
(Continued)

(52) U.S. Cl.
CPC ............... *B21J 9/025* (2013.01); *B21K 1/40* (2013.01); *B21K 25/00* (2013.01); *F16C 19/185* (2013.01);
(Continued)

(58) Field of Classification Search
CPC ... B21J 9/022; B21J 9/06; B21J 9/025; B21K 1/40; B21K 25/00; B60B 2310/2082; B60B 2310/312; F16C 2226/52
See application file for complete search history.

(56) References Cited

U.S. PATENT DOCUMENTS

| 4,671,092 A | 6/1987 | Fomichev et al. |
| 10,065,235 B2 | 9/2018 | Zieve et al. |

(Continued)

FOREIGN PATENT DOCUMENTS

| CN | 108714676 A | 10/2018 |
| EP | 0 854 303 A2 | 7/1998 |

(Continued)

OTHER PUBLICATIONS

Written Opinion of the International Searching Authority for International Application No. PCT/JP2020/006675 (Year: 2020).*

(Continued)

*Primary Examiner* — Christopher J. Besler
(74) *Attorney, Agent, or Firm* — Sughrue Mion, PLLC

(57) ABSTRACT

A method of manufacturing a hub unit bearing (1) includes the step of applying an axial load to a shaft end of a hub body (21) so that a staking portion (26) for inner races (22a, 22b) is formed in the hub body (21). The load is adjusted based on at least one of first information acquired before applying the load and second information acquired while applying the load.

7 Claims, 13 Drawing Sheets

(51) Int. Cl.
  B21K 25/00 (2006.01)
  F16C 19/18 (2006.01)
  F16C 25/06 (2006.01)
(52) U.S. Cl.
  CPC .......... *F16C 25/06* (2013.01); *F16C 2226/52* (2013.01); *F16C 2233/00* (2013.01); *F16C 2326/02* (2013.01)

(56) References Cited

U.S. PATENT DOCUMENTS

| | | | |
|---|---|---|---|
| 2002/0062564 A1 | 5/2002 | Hagiwara et al. | |
| 2007/0227004 A1 | 10/2007 | Tsuzaki et al. | |
| 2016/0263940 A1 | 9/2016 | Hagiwara | |
| 2018/0243818 A1* | 8/2018 | Hagiwara | B21J 9/025 |
| 2018/0257129 A1 | 9/2018 | Kikuchi et al. | |
| 2020/0009642 A1 | 1/2020 | Maruno et al. | |

FOREIGN PATENT DOCUMENTS

| | | | | |
|---|---|---|---|---|
| FR | 382249 A | 2/1908 | | |
| JP | 10-196661 A | 7/1998 | | |
| JP | 2001-162338 A | 6/2001 | | |
| JP | 2002-225503 A | 8/2002 | | |
| JP | 2003-275832 A | 9/2003 | | |
| JP | 2005-195084 A | 7/2005 | | |
| JP | 2007-271045 A | 10/2007 | | |
| JP | 2015-077616 A | 4/2015 | | |
| JP | 2017-013079 A | 1/2017 | | |
| JP | 2017-018991 A | 1/2017 | | |
| JP | 2017-067254 A | 4/2017 | | |
| JP | 2017-106510 A | 6/2017 | | |
| JP | 6332572 B1 | 5/2018 | | |
| WO | WO-2018012450 A1 * | 1/2018 | ............... | B21J 9/02 |
| WO | 2018/159670 A1 | 9/2018 | | |

OTHER PUBLICATIONS

Extended European Search Report dated Dec. 5, 2022 from the European Patent Office in EP Application No. 20787498.3.
Partial Supplementary European Search Report issued Aug. 26, 2022 in European Application No. 20787357.1.
International Search Report for PCT/JP2020/015920, dated Jul. 14, 2020.
International Search Report for PCT/JP2020/006675, dated Apr. 28, 2020.
Written Opinion of The International Searching Authority dated Jul. 14, 2020 in International Application No. PCT/JP2020/015920.
Requirement for Restriction/Election dated Jan. 3, 2023 which issued during the prosecution of U.S. Appl. No. 17/599,712.
Japanese Office Action issued Feb. 27, 2024 in Application No. 2021-133776.
Office Action dated Apr. 5, 2023 issued in U.S. Appl. No. 17/599,712.

* cited by examiner

< FIRST STEP >

<SECOND STEP>

200

STAKING ASSEMBLY MANUFACTURING METHOD, HUB UNIT BEARING MANUFACTURING METHOD, AND VEHICLE MANUFACTURING METHOD

CROSS REFERENCE TO RELATED APPLICATIONS

This application is a National Stage of International Application No. PCT/JP2020/006675 filed Feb. 20, 2020, claiming priority based on Japanese Patent Application No. 2019-074550 filed Apr. 10, 2019, the content of which is incorporated herein by reference.

TECHNICAL FIELD

The present invention relates to a staking assembly, a hub unit bearing manufacturing method, and a vehicle manufacturing method.

BACKGROUND ART

Conventionally, there is known a hub unit bearing that includes a hub body (hub race) in which a hub rotating together with a vehicle wheel fixes the vehicle wheel and an inner race which is externally fitted to the hub body and is pressed against an axial side surface of the inner race by a staking portion formed at an axial end portion of the hub body. For example, a vehicle wheel and a braking rotation body of an automobile are rotatably supported to a suspension device by the hub unit bearing. In order to increase the rigidity of the hub unit bearing, a preload is applied to a rolling element based on the fact that at least the axial side surface of the inner race is pressed by the staking portion.

Japanese Patent Application Publication No. 2005-195084 (Patent Literature 1) describes swaging that presses a forming die swinging and rotating about a center axis of a hub body against an axial end portion of the hub body as a method of processing the axial end portion of the hub body into a staking portion. Further, Japanese Patent Application Publication No. 2005-195084 (Patent Literature 1) describes a method of suppressing a load applied from a staking portion to an inner race and directed outward in a radial direction by performing swaging in two stages and changing a shape of a forming die or a swing angle of the forming die as the first stage and the second stage.

Further, Japanese Patent Application Publication No. 2017-18991 (Patent Literature 2), Japanese Patent Application Publication No. 2017-67254 (Patent Literature 3), and Japanese Patent Application Publication No. 2017-106510 (Patent Literature 4) describe a method of preventing an unbalanced load from being applied to an axial end portion of a hub body as a method of processing a staking portion.

CITATION LIST

Patent Literature

[Patent Literature 1]
Japanese Patent Application Publication No. 2005-195084
[Patent Literature 2]
Japanese Patent Application Publication No. 2017-18991

[Patent Literature 3]
Japanese Patent Application Publication No. 2017-67254
[Patent Literature 4]
Japanese Patent Application Publication No. 2017-106510

SUMMARY OF INVENTION

Technical Problem

The preload of the hub unit bearing affects driving stability of automobiles. Particularly, it is said that the influence of the preload of the hub unit bearing is greater when an electric motor is used than when an engine is used as a power source for an automobile. In order to further make the driving stability of automobiles more uniform, it is required to adjust the preload as targeted in the manufacturing of the hub unit bearing. It is considered that the method of performing the processing for forming the staking portion in two stages described in Japanese Patent Application Publication No. 2005-195084 (Patent Literature 1) is also effective in adjusting the preload of the hub unit bearing. However, Japanese Patent Application Publication No. 2005-195084 (Patent Literature 1) does not describe specific contents such as how to adjust the preload.

An object of the present invention is to realize a staking assembly manufacturing method, a hub unit bearing manufacturing method, and a vehicle manufacturing method capable of adjusting a preload.

Solution to Problem

A method of manufacturing a staking assembly according to an aspect of the present invention includes the steps of: combining a first member with a second member having a hole into which the first member is inserted in an axial direction; and applying at least an axial load to a shaft end of the first member so that a staking portion for the second member is formed in the first member, this step including a step of adjusting the load based on at least one of (a) first information acquired before applying the load and (b) second information acquired while applying the load.

In a method of manufacturing a hub unit bearing according to an aspect of the present invention, the hub unit bearing includes an outer race having an outer race track, a hub having an inner race track, and a plurality of rolling elements disposed between the outer race track and the inner race track and the hub includes a hub body and an inner race disposed on the outside of the hub body and held by the hub body. The method includes the steps of: combining the hub body with the inner race having a hole into which the hub body is inserted in an axial direction; and applying an axial load to a shaft end of the hub body so that a staking portion for the inner race is formed in the hub body, this step including a step of adjusting the load based on at least one of (a) first information acquired before applying the load and (b) second information acquired while applying the load.

In an aspect of the present invention, the hub unit bearing to be manufactured includes an outer race having a double-row outer race track on an inner peripheral surface, a hub having a double-row inner race track on an outer peripheral surface, and a plurality of rolling elements arranged for each row between the double-row inner race track and the double-row outer race track. The hub includes a hub body and an internal inner race having an inner race track of an axial inner row in the double-row inner race track provided on an outer peripheral surface. The internal inner race is externally fitted to the hub body and pressed against an axial inner surface by a staking portion formed by plastically deforming an axial inner end portion of the hub body to be crushed outward in the axial direction and expanded outward in the radial direction. A preload is applied to the rolling element based on at least the staking portion pressing an axial inner surface of the internal inner race.

In the method of manufacturing the hub unit bearing according to an aspect of the present invention, in a staking portion forming step of forming the staking portion, processing for forming the staking portion is performed in a plurality of stages and at least in a final stage of the plurality of stages, the axial load applied to the axial inner end portion of the hub body is determined by using at least one information selected from information acquired before a current stage in the staking portion forming step and information acquired by a step before the staking portion forming step.

For example, the staking portion forming step includes a first step and a second step. The first step is a step of processing a cylindrical portion provided in the axial inner end portion of the hub body before forming the staking portion into a staking portion intermediate body. The second step is a step of processing the staking portion intermediate body into the staking portion.

For example, in the first step, the staking portion intermediate body is not in contact with the axial inner surface of the internal inner race.

For example, in the first step, the cylindrical portion is processed into the staking portion intermediate body by swaging that presses a forming die swinging and rotating about a center axis of the hub body against the axial inner end portion of the hub body. Then, the swaging end time point in the first step is determined by using a value of a forming rotation torque which is a torque for swinging and rotating the forming die.

In this case, for example, the swaging end time point in the first step is set to a time point in which the forming rotation torque first settles to an almost constant value after the swaging starts or a time point in which the forming rotation torque first settles to an almost constant value and the forming rotation torque starts to decrease after the swaging starts.

For example, in the second step, the axial load applied to the axial inner end portion of the hub body is determined by using information acquired in the first step.

For example, in the first step, the cylindrical portion is processed into the staking portion intermediate body by swaging that presses a forming die swinging and rotating about a center axis of the hub body against the axial inner end portion of the hub body. Then, the information acquired in the first step includes an axial load applied from the forming die to the axial inner end portion of the hub body, a forming rotation torque for swinging and rotating the forming die, and an axial movement speed of the forming die.

For example, in the second step, the axial load applied to the axial inner end portion of the hub body is determined by using information acquired in a step before the first step in addition to the information acquired in the first step.

When the hub further includes an external inner race having an inner race track of an axial outer row on an outer peripheral surface in the double-row inner race track and the external inner race is externally fitted to the hub body, for example, the information acquired in the step before the first step includes at least one of a fitting allowance between the internal inner race and the external inner race of the hub body, a press-fitting load of the internal inner race and the external inner race with respect to the hub body, and a bearing axial gap.

When the hub body includes an inner race track of an axial outer row on an outer peripheral surface in the double-row inner race track, for example, the information acquired by the step before the first step includes at least one of a fitting allowance between the hub body and the internal inner race, a press-fitting load of the internal inner race with respect to the hub body, an inter-row width of the double-row outer race track, an inter-row width of the double-row inner race track, a diameter of the rolling element for each row, and a pitch circle diameter of the rolling element for each row.

For example, in the second step, the axial load applied to the axial inner end portion of the hub body is determined by using a relational expression having a dependent variable which is the axial load applied to the axial inner end portion of the hub body and independent variables which are each of the acquired information and a target value of the preload. In this case, for example, a relational expression obtained by multiple regression analysis can be used as the relational expression.

For example, in the second step, processing for forming the staking portion from the staking portion intermediate body is performed in a plurality of stages, an outer race rotation torque which is for rotating the outer race with respect to the hub is measured after the processing of each stage ends, and in each of the stages after the second stage, the axial load applied to the axial inner end portion of the hub body is determined by using the information of the outer race rotation torque measured after the processing of the precedent stage ends.

For example, when a value of the outer race rotation torque at a current time point is smaller than a value of the outer race rotation torque while the preload becomes the target value, a relationship between a difference between these values and the axial load applied to the axial inner end portion of the hub body in order to bring the difference closer to zero is obtained in advance. Then, in each stage after the second stage, the value of the outer race rotation torque measured after the processing of the precedent stage ends is used as the value of the outer race rotation torque at a current time point and the axial load applied to the axial inner end portion of the hub body is determined by using the value and the relationship.

For example, in the second step, the staking portion intermediate body is processed into the staking portion by swaging that presses a forming die swinging and rotating about a center axis of the hub body against the axial inner end portion of the hub body.

For example, in the second step, the staking portion intermediate body is processed into the staking portion while applying a load to a plurality of rotationally symmetric positions about a center axis of the hub body in the axial inner end portion of the hub body. In this case, for example, a step of attaching a sealing member closing an axial inner end opening of an inner space existing between an inner peripheral surface of the outer race and an outer peripheral surface of the hub to a gap between the outer race and the internal inner race is performed between the first step and the second step.

For example, in the second step, a processing force directed inward in the radial direction is applied to the staking portion in a final stage of processing for forming the staking portion.

In an aspect of the present invention, a vehicle to be manufactured includes a hub unit bearing. In a method of manufacturing a vehicle according to an aspect of the present invention, the hub unit bearing is manufactured by the method of manufacturing the hub unit bearing of the aspect.

Advantageous Effects of Invention

According to the aspect of the present invention, it is possible to adjust the preload of the hub unit bearing.

DESCRIPTION OF EMBODIMENTS

First Embodiment

A first embodiment of the present invention will be described with reference to FIGS. 1 to 6. First, a structure of a hub unit bearing 1 to be manufactured will be described and then a method of manufacturing the hub unit bearing 1 will be described.

<Structure of Hub Unit Bearing 1>

Figure 1:
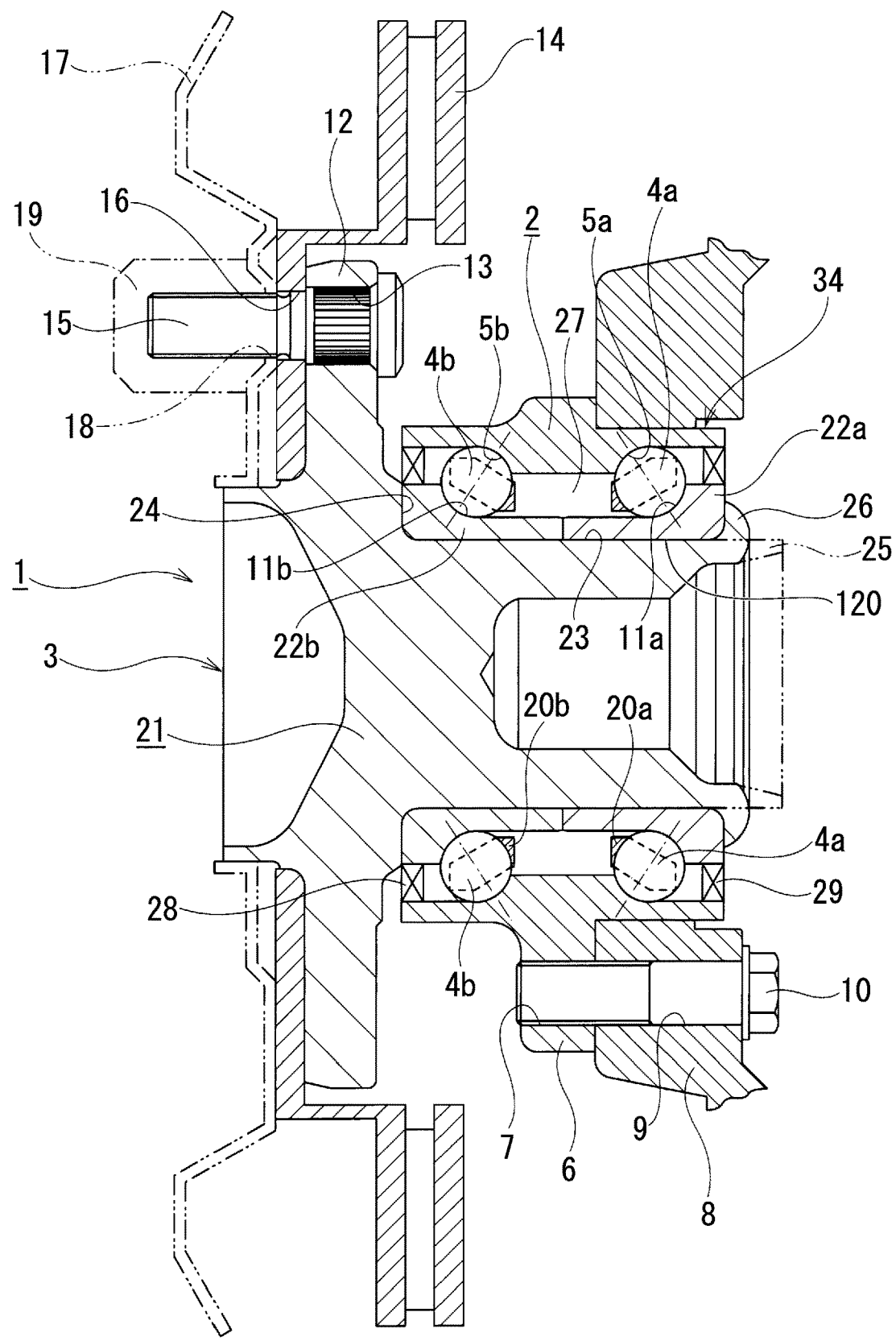
FIG. 1 is a cross-sectional view showing an example of a state in which a hub unit bearing is assembled to a vehicle.

FIG. 1 shows an example of the hub unit bearing 1. The hub unit bearing 1 is for a driven wheel and includes an outer race 2, a hub 3, and a plurality of rolling elements 4a and 4b.

Regarding the hub unit bearing 1, the outside in the axial direction is the left side of FIG. 1 which is the outside of the vehicle in the width direction when assembled to the vehicle. The inside in the axial direction is the right side of FIG. 1 which is the center side of the vehicle in the width direction when assembled to the vehicle.

The outer race 2 includes double-row outer race tracks 5a and 5b and a stationary flange 6. In an example, the outer race 2 is a hard metal such as medium carbon steel. In another example, the outer race 2 can be formed of a different material. The double-row outer race tracks 5a and 5b are provided on the inner peripheral surface of the axial intermediate portion of the outer race 2 over the entire circumference. The stationary flange 6 protrudes outward in the radial direction from the axial intermediate portion of the outer race 2 and includes support holes 7 which are screw holes at a plurality of positions in the circumferential direction.

The outer race 2 is supported and fixed to a knuckle 8 by screwing and tightening a bolt 10 inserted through a through hole 9 of the knuckle 8 constituting a suspension device of the vehicle to the support hole 7 of the stationary flange 6 from the inside in the axial direction.

The hub (staking assembly and staking unit) 3 is disposed on the inside of the outer race 2 in the radial direction coaxially with the outer race 2. The hub 3 includes double-row inner race tracks 11a and 11b and a rotational flange 12. The double-row inner race tracks 11a and 11b are provided at portions facing the double-row outer race tracks 5a and 5b on the outer peripheral surface (outer surface) of the hub 3 over the entire circumference. The rotational flange 12 protrudes outward in the radial direction from a portion located on the outside in the axial direction in relation to the outer race 2 in the hub 3 and includes attachment holes 13 formed at a plurality of positions in the circumferential direction.

In the example shown in the drawings, in order to couple and fix a braking rotation body 14 such as a disc or a drum to a rotational flange 12, a serration portion provided in near a base end of a stud 15 is press-fitted into the attachment hole 13. Further, an intermediate portion of the stud 15 is press-fitted into a through hole 16 of the braking rotation body 14. Furthermore, in order to fix a wheel 17 constituting a vehicle wheel to the rotational flange 12, a nut 19 is screwed into a male threaded portion and is tightened in a state in which the male threaded portion provided at the tip of the stud 15 is inserted through a through hole 18 of the wheel 17.

Figure 14:
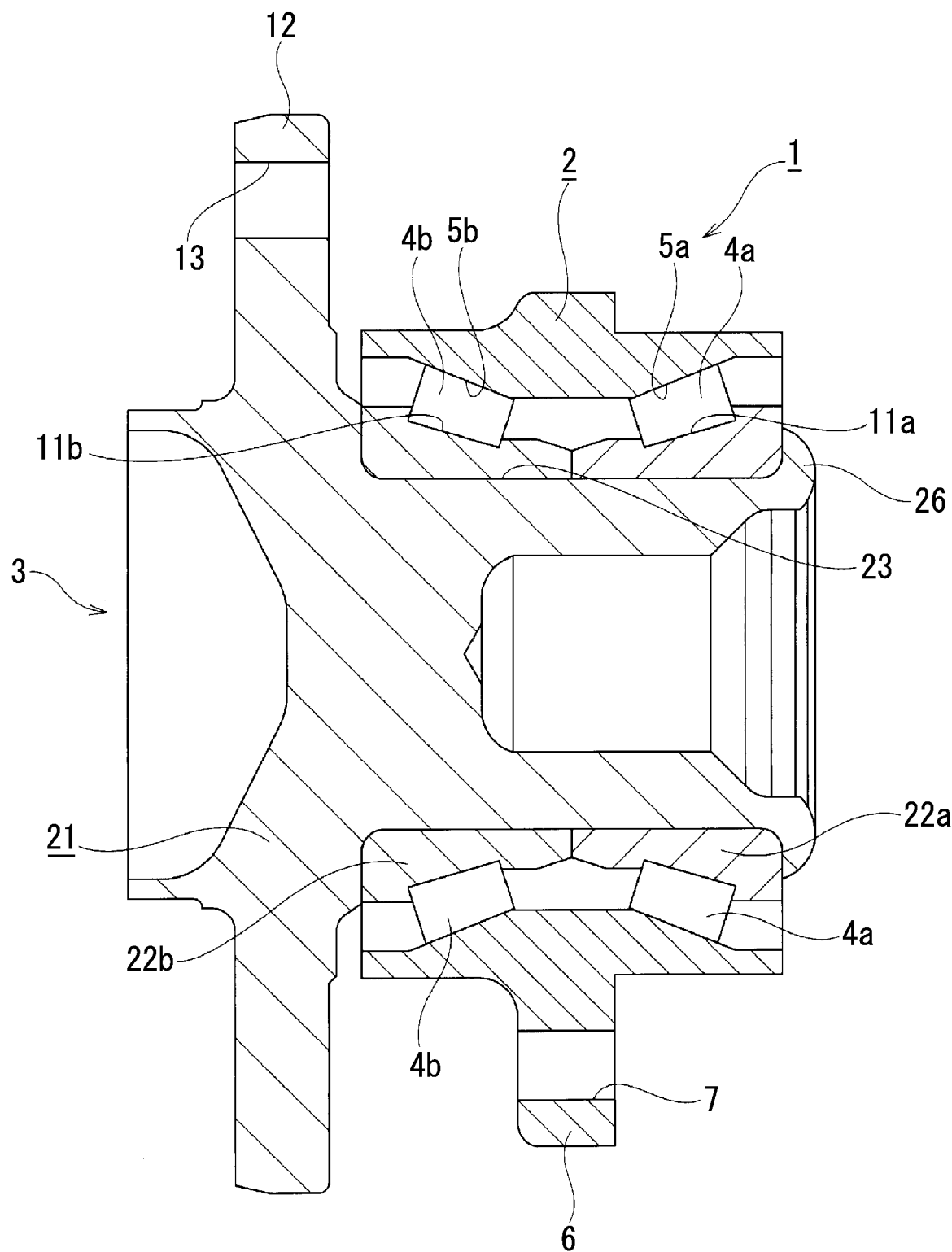
FIG. 14 is a cross-sectional view showing an example of a hub unit bearing using a tapered roller.

A plurality of the rolling elements 4a and 4b are arranged in each row between the double-row outer race tracks 5a and 5b and the double-row inner race tracks 11a and 11b. In an example, each of the rolling elements 4a and 4b is formed of a hard metal such as bearing steel or ceramics. In another example, the rolling elements 4a and 4b can be formed of a different material. Further, the rolling elements 4a and 4b are held by cages 20a and 20b in a rolling manner for each row. Additionally, in the example of FIG. 1, balls are used as the rolling elements 4a and 4b, but tapered rollers may be used as shown in the example of FIG. 14.

The hub (staking assembly) 3 includes a hub body (hub race) 21, an internal inner race 22a, and an external inner race 22b. In an example, the hub body 21 is formed of a hard metal such as medium carbon steel. Each of the internal inner race 22a and the external inner race 22b is formed of a hard metal such as bearing steel. In another example, the hub body 21, the internal inner race 22a, and the external inner race 22b can be formed of different materials. The hub (staking assembly) 3 is configured by substantially combining the hub body (first member) 21 and the inner races (second member) 22a and 22b in the axial direction. The hub 3 includes the hub body 21 which has an outer peripheral surface (outer surface) 23 and the inner races (second members) 22a and 22b which are disposed on the outer peripheral surface (outer surface) 23 of the hub body 21 and held by the hub body (first member) 21. The inner race track 11a of the axial inner row is provided on the outer peripheral surface of the internal inner race 22a. The inner race track 11b of the outer row in the axial direction is provided on the outer peripheral surface of the inner race 22b. The rotational flange 12 is provided on the axial outer portion of the hub body 21. The hub body 21 includes a cylindrical fitting surface portion 23 on the outer peripheral surface of the axial intermediate portion and includes a step surface 24 formed at the axial outer end portion of the fitting surface portion 23 to face inward in the axial direction. The internal inner race 22a and the external inner race 22b are externally fitted to the fitting surface portion 23 of the hub body 21 by tightening. Further, the hub body 21 includes a staking portion 26 formed at the axial inner end portion. The staking portion 26 is bent outward in the radial direction from the axial inner end portion of the portion to which the internal inner race 22a is externally fitted in the hub body 21 and is pressed against the axial inner surface of the internal inner race 22a. That is, the internal inner race 22a and the external inner race 22b are sandwiched between the step surface 24 and the staking portion 26 of the hub body 21 so that the separation from the hub body 21 is prevented. In this state, a preload is applied to the double-row rolling elements 4a and 4b constituting the hub unit bearing 1 together with a rear combination type contact angle. In an example, the hub body 21 includes the staking portion 26 for the inner races 22a and 22b (the staking portion 26 for holding the inner races 22a and 22b). The hub body 21 is inserted into holes 120 of the inner races 22a and 22b. The peripheral wall of the hub body 21 is provided with the staking portion 26 having a bend extending in the circumferential direction and covering the shaft end portion of the inner race 22a.

Both axial end openings of an inner space 27 existing between the inner peripheral surface of the outer race 2 and the outer peripheral surface of the hub 3 are closed by sealing members 28 and 29. The sealing member 28 on the inside in the axial direction is assembled between the inner peripheral surface of the axial inner end portion of the outer race 2 and the outer peripheral surface of the axial inner end portion of the internal inner race 22a. The sealing member 29 on the outside in the axial direction is assembled between the inner peripheral surface of the axial outer end portion of the outer race 2 and the outer peripheral surface of the axial outer end portion of the external inner race 22b. These sealing members 28 and 29 prevent grease sealed in the inner space 27 from leaking to the outer space through both axial end openings of the inner space 27. Further, foreign matter such as muddy water existing in the outer space is prevented from entering the inner space 27 through both axial end openings of the inner space 27.

<Method of Manufacturing Hub Unit Bearing 1>

Figure 2:
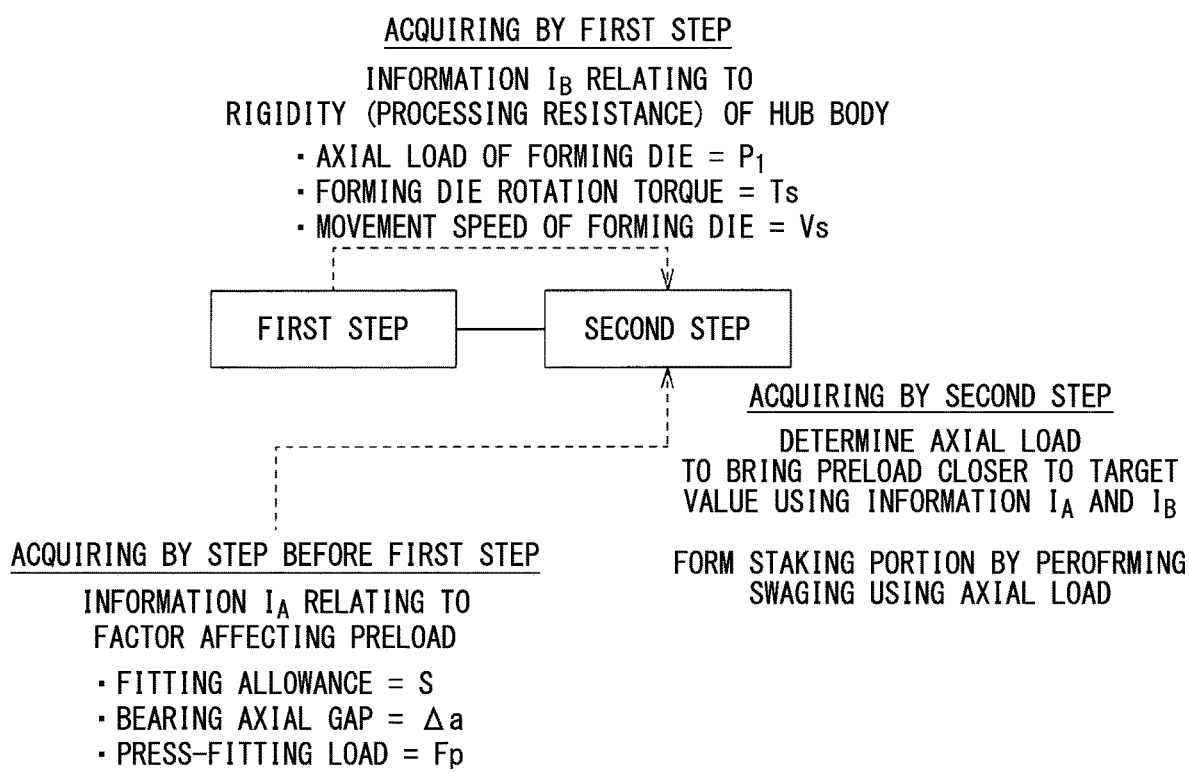
FIG. 2 is a block diagram for illustrating a staking portion forming step of a first embodiment.
Figure 3A:
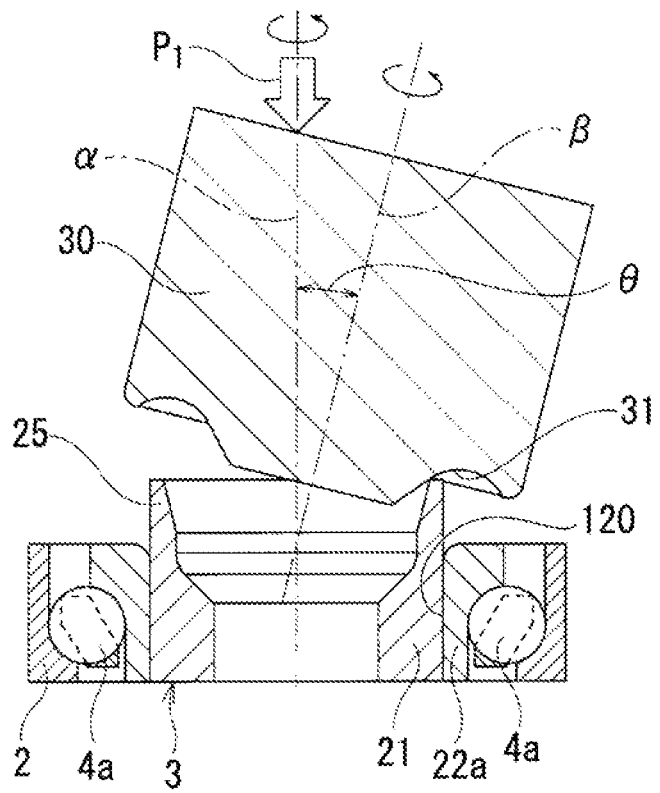
FIG. 3(a) is a partially cross-sectional view showing a start state of a first step of the staking portion forming step of the first embodiment and FIG. 3(b) is a partially cross-sectional view showing an end state of the first step.
Figure 3B:
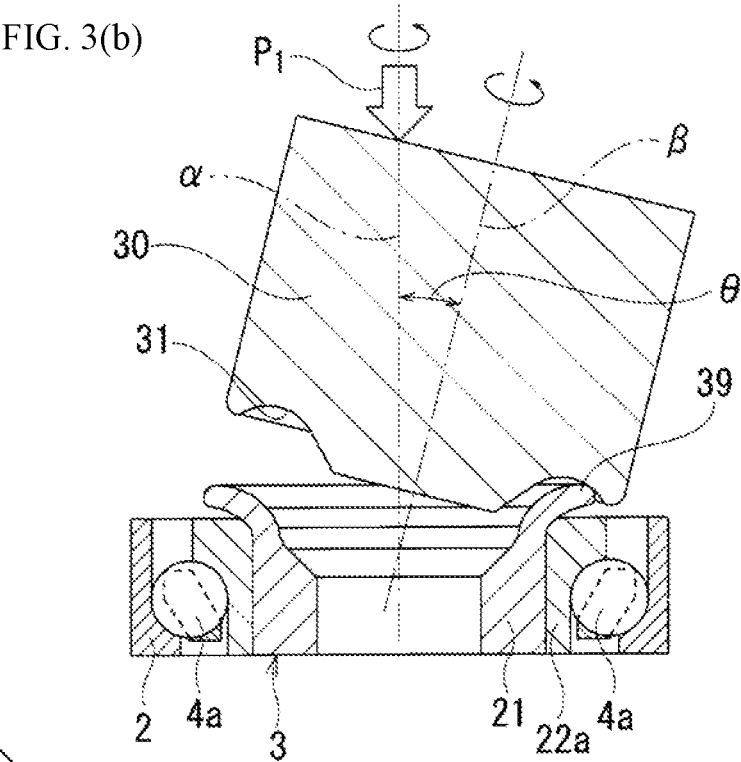

According to this embodiment, in a method of manufacturing the hub unit bearing 1, in order to bring a preload applied to the rolling elements 4a and 4b closer to a target value, a staking portion forming step of forming the staking portion 26 is divided into a first step and a second step and in the second step, an axial load applied to the axial inner end portion of the hub body 21 is determined by using information (second information) $I_B$ acquired in the first step and information (first information) $I_A$ acquired by a step before the staking portion forming step (see FIG. 2). A method of manufacturing the hub body 21 includes a step of axially combining the hub body 21 and the inner races 22a and 22b including the holes 120 into which the hub body 21 is inserted and a step of forming the staking portion 26 for the inner races 22a and 22b in the hub body 21 by applying at least a load (axial load) in the axial direction to the shaft end of the hub body 21. The step of forming the staking portion 26 includes a step of adjusting the load (axial load) based on at least one of (a) the first information $I_A$ acquired before applying the load (axial load) and (b) the second information $I_B$ acquired while applying the load (axial load). Additionally, the first step is a step of processing a cylindrical portion 25 provided at the axial inner end portion of the hub body 21 before forming the staking portion 26 into a staking portion intermediate body (intermediate staking portion) 39 (see FIG. 3(a) and FIG. 3(b)). The second step is a step of processing the staking portion intermediate body 39 into the staking portion 26 (see parts FIG. 5(a) and FIG. 5(b)). The step of forming the staking portion 26 includes the first step of forming the intermediate staking portion 39 with a predetermined load and the second step of forming the final staking portion 26 by applying an adjusted load to the intermediate staking portion 39.

In an example, the staking portion intermediate body (intermediate staking portion) 39 is defined as the shaft end shape of the hub body 21 which is plastically deformed in at least a part in the first step (for example, from the start of load application to the completion of load adjustment (preload adjustment)). Alternatively, the staking portion intermediate body (intermediate staking portion) 39 is defined as the shaft end shape of the hub body 21 which is plastically deformed in at least a part at the (preload adjustment completion) time point in which the adjustment of the load is completed. For example, the staking portion intermediate body (intermediate staking portion) 39 has a shaft end shape of the hub body 21 at a time point in which the adjustment of the preload to be described later is completed. The adjusted load is constantly applied to the intermediate staking portion 39 to form the final staking portion 26. In an example, the staking portion intermediate body (intermediate staking portion) 39 is not substantially in contact with the inner race 22a. In another example, the staking portion intermediate body (intermediate staking portion) 39 is substantially in contact with the inner race 22a.

For example, in the method of manufacturing the hub unit bearing 1, specifically, in the first step, the information (second information) $I_B$ on the processing resistance, in other words, the hardness of the hub body 21 when processing the cylindrical portion 25 into the staking portion intermediate body 39 is acquired. The information $I_B$ includes information relating to the physical characteristics of the hub body 21. In the second step, an axial load applied to the axial inner end portion of the hub body 21 and required for bringing a preload closer to a target value is determined by using the information $I_D$. In an example, in the second step, an axial load applied to the axial inner end portion of the hub body 21 and required for bringing a preload closer to a target value is determined by using not only the information (second information) $I_B$ acquired in the first step but also the information (first information) $I_A$ relating to a factor affecting a preload such as a dimension of a specific component in the information acquired in the step before the staking portion forming step. The information (first information) $I_A$ includes information relating to a combination of the hub body 21 and the inner races 22a and 22b. For example, the information (first information) $I_A$ includes information acquired or measured when combining the hub body 21 and the inner races 22a and 22b. In an example, an axial load when processing the intermediate staking portion 39 into the final staking portion 26 is determined based on both the first information $I_A$ acquired before applying the load (axial load) and the second information $I_B$ acquired while applying the load (axial load). In another example, an axial load when processing the intermediate staking portion 39 into the final staking portion 26 is determined based on substantially only the first information $I_A$ acquired before applying the load (axial load). In another example, an axial load when processing the intermediate staking portion 39 into the final staking portion 26 is determined based on substantially only the second information $I_B$ acquired while applying the load (axial load). Furthermore, in another example, an axial load when processing the intermediate staking portion 39 into the final staking portion 26 is determined based on at least one of the first information and the second information and information different from the first and second information.

Hereinafter, each of the information $I_A$ acquired in the step before the staking portion forming step and the information $I_B$ acquired in the first step will be described in detail in order what kind of information and a detailed method of determining an axial load applied to the axial inner end portion of the hub body 21 and required to bring a preload closer to a target value will be described by using the information $I_A$ and $I_B$ in the second step.

(Step Before Staking Portion Forming Step)

In this embodiment, three pieces of information are adopted as the information $I_A$ acquired in the step before the staking portion forming step. The first information included in the information $I_A$ is information on the fitting allowance S between the fitting surface portion 23 of the hub body 21, the internal inner race 22a, and the external inner race 22b. Therefore, for example, in the step before the staking portion forming step, the outer diameter dimension of the fitting surface portion 23 of the hub body 21 and the inner diameter dimensions of the internal inner race 22a and the external inner race 22b are measured. The fitting allowance S (the first information included in the information $I_A$) which is a difference between the outer diameter dimension of the fitting surface portion 23 of the hub body 21 and the inner diameter dimensions of the internal inner race 22a and the external inner race 22b measured in this way is obtained in advance.

The second information included in the information $I_A$ is information on a bearing axial gap Δa before forming the staking portion 26. The third information included in the information $I_A$ is information on a press-fitting load $F_P$ for press-fitting the internal inner race 22a and the external inner race 22b into the fitting surface portion 23. This information is acquired in the step of assembling the hub unit bearing 1 before forming the staking portion 26. Next, an example of an assembly method will be described with reference to FIG. 1.

The hub unit bearing 1 before forming the staking portion 26 is assembled by, for example, the following procedure. First, the rolling element 4a of the inner row in the axial direction held by the cage 20a is disposed on the inside in the radial direction of the outer race track 5a of the inner row in the axial direction. The rolling element 4b of the outer row in the axial direction held by the cage 20b is disposed on the inside in the radial direction of the outer race track 5b of the outer row in the axial direction. Next, the internal inner race 22a is inserted to the inside of the outer race 2 in the radial direction from the inside in the axial direction. The external inner race 22b is inserted to the inside of the outer race 2 in the radial direction from the outside in the axial direction so that a bearing assembly 34 is assembled.

Next, a bearing axial gap Δa of the bearing assembly 34 (the second information included in the information $I_A$) is measured as the bearing axial gap before forming the staking portion 26. Here, the bearing axial gap is an internal gap of the bearing in the axial direction. The bearing axial gap Δa of the bearing assembly 34 is an internal gap of the bearing assembly 34 in the axial direction while the facing axial side surfaces of the internal inner race 22a and the external inner race 22b constituting the bearing assembly 34 are in contact with each other. In an example, the bearing axial gap Δa is positive (>0). Therefore, the bearing axial gap Δa can be measured based on the relative movement of the internal inner race 22a, the external inner race 22b, and the outer race 2 in the axial direction while the facing axial side surfaces of the internal inner race 22a and the external inner race 22b are in contact with each other. In another example, the bearing axial gap Δa can be set to a different value.

Next, the sealing member 28 on the outside in the axial direction is attached to the bearing assembly 34. Additionally, the sealing member 28 on the inside in the axial direction is not attached in this stage and is attached after forming the staking portion 26.

Next, the internal inner race 22a and the external inner race 22b constituting the bearing assembly 34 are press-fitted to the fitting surface portion 23 of the hub body 21 before forming the staking portion 26 from the inside in the axial direction (the right side in FIG. 1). Accordingly, the internal inner race 22a and the external inner race 22b are tightly fitted to the fitting surface portion 23 and the facing axial side surfaces of the internal inner race 22a and the external inner race 22b are brought into contact with each other. Further, the axial outer surface of the external inner race 22b is brought into contact with the step surface 24 of the hub body 21 so that the hub unit bearing 1 before forming the staking portion 26 is obtained. At this time, the press-fitting load $F_P$ for press-fitting the internal inner race 22a and the external inner race 22b to the fitting surface portion 23 (the third information included in the information $I_A$) is measured.

As described above, when the internal inner race 22a and the external inner race 22b constituting the bearing assembly 34 are press-fitted to the fitting surface portion 23 of the hub body 21 before forming the staking portion 26, the internal inner race 22a and the external inner race 22b are enlarged to the degree corresponding to the fitting allowance S and the bearing axial gap changes from positive to negative. As a result, the bearing axial gap Δa' in this state is negative in many cases. That is, a certain degree of a preload is applied to the hub unit bearing 1 before forming the staking portion 26 in many cases.

In this embodiment, the staking portion 26 is then formed and the axial inner surface of the internal inner race 22a is pressed by the staking portion 26 to increase a preload (increase a preload that has already been applied or apply a preload that has not been applied so far and increase the preload) so that the preload approaches the target value.

(First Step of Staking Portion Forming Step)

In the first step, the cylindrical portion 25 is processed into the staking portion intermediate body 39 by swaging using a first staking device including a first forming die 30 shown in FIG. 3(*a*) and FIG. 3(*b*). In the following description, the up and down direction means the up and down direction in the drawing.

In the first step, the cylindrical portion 25 is processed into the staking portion intermediate body 39 by swaging using a first staking device including a first forming die 30 shown in parts (a) and (b) of FIG. 3. In the following description, the up and down direction means the up and down direction in the drawing.

The first forming die 30 is disposed above the hub 3 and has a rotation axis β inclined by a predetermined angle θ with respect to a center axis α of the hub 3. Further, the first forming die 30 includes a processing surface portion 31 which is formed at the lower end portion as an annular concave surface about the rotation axis β. The first forming die 30 is movable in the up and down direction, is swingable about the center axis α of the hub 3, and is rotatable about the rotation axis β. In the state before the start of processing, the first forming die 30 is located above the position shown in FIG. 3(*a*) and is not in contact with the cylindrical portion 25.

When swaging is performed on the cylindrical portion 25 using the first forming die 30, the outer race 2 is rotated with respect to the hub 3 and the first forming die 30 is swung and rotated about the center axis α of the hub 3 while the displacement of the hub body 21 is prevented. Then, in this state, the first forming die 30 is moved downward so that the processing surface portion 31 of the first forming die 30 is pressed against the cylindrical portion 25 as shown in FIG. 3(*a*). As a result, the staking portion intermediate body 39 is formed as shown in FIG. 3(*a*) and FIG. 3(*b*). That is, a processing force which is directed downward in the up and down direction and outward in the radial direction is applied from the processing surface portion 31 of the first forming die 30 to a part of the cylindrical portion 25 in the circumferential direction. Further, a position where this processing force is applied is continuously changed in the circumferential direction of the cylindrical portion 25 in accordance with the swinging rotation of the first forming die 30 about the center axis β of the hub 3. Accordingly, the staking portion intermediate body 39 is formed by plastically deforming the cylindrical portion 25 to spread outward in the radial direction while being crushed outward in the axial direction.

In an example, the staking portion intermediate body 39 has a shape in which the axial outer surface is not in contact with the axial inner surface of the internal inner race 22*a* or is in contact with the axial inner surface of the internal inner race 22*a* to a degree that the inner race track 11*a* of the inner row in the axial direction is not deformed as shown in FIG. 3(*b*). For example, the staking portion intermediate body 39 has a shape in which a preload does not change in accordance with the formation of the staking portion intermediate body 39. In an example, swaging ends at a time point in which such a staking portion intermediate body 39 is formed. Then, the first forming die 30 is retracted upward with respect to the hub body 21.

In this embodiment, in order to form the above-described staking portion intermediate body 39, a time point (timing) in which swaging ends in the first step is determined based on the forming rotation torque $T_s$ which is a torque for swinging and rotating the first forming die 30. This point will be described with reference to FIG. 4. Additionally, the forming rotation torque $T_s$ can be measured based on, for example, a current value of an electric motor for a forming die (not shown) for swinging and rotating the first forming die 30.

Figure 4:
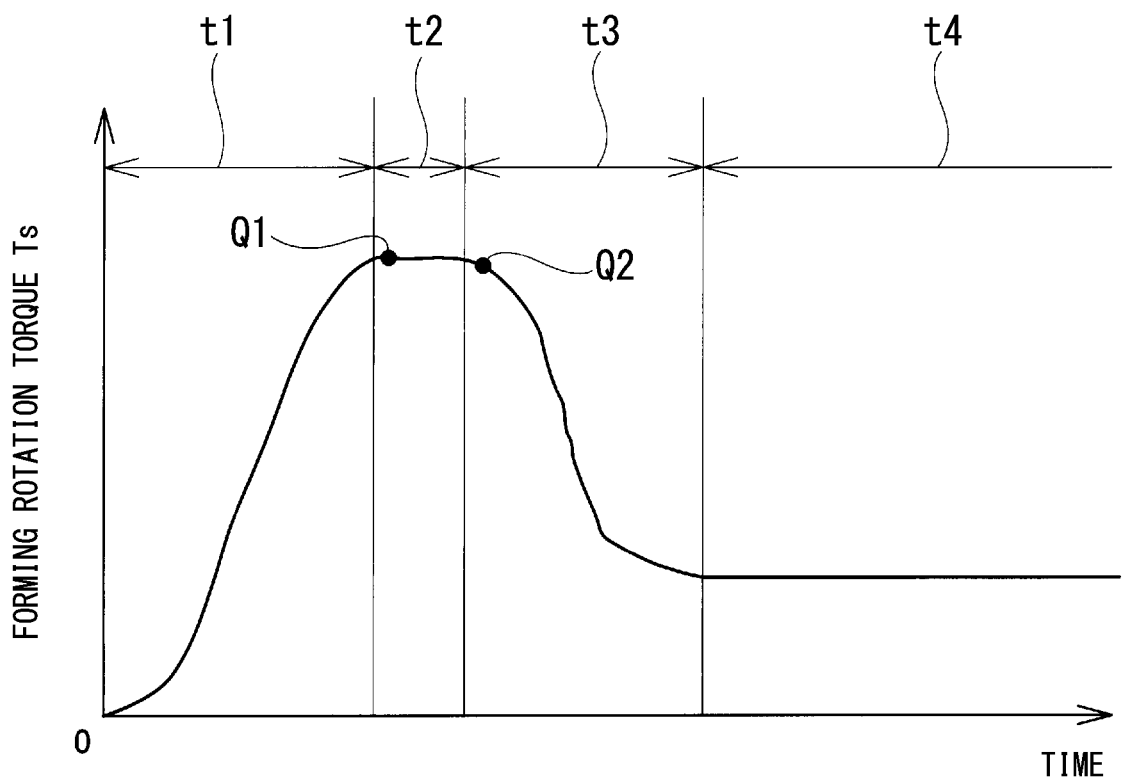
FIG. 4 is a diagram showing a change in a forming rotation torque $T_s$ over time when a staking portion is formed by a staking device used in the first step of the staking portion forming step of the first embodiment.

FIG. 4 is a diagram showing a change in the forming rotation torque $T_s$ over time when processing the cylindrical portion 25 into the staking portion 26 only according to swaging using the first forming die 30. In this case, the forming rotation torque $T_s$ gradually increases at a first stage (time zone t1) after starting swaging. At a subsequent second stage (time zone t2), the forming rotation torque $T_s$ settles to an almost constant value. At a subsequent third stage (time zone t3), the forming rotation torque $T_s$ gradually decreases. At a subsequent fourth stage (time zone t4), the forming rotation torque $T_s$ settles to an almost constant value again.

The axial inner end portion of the hub body 21 subjected to swaging is not in contact with the axial inner surface of the internal inner race 22*a* at the first and second stages (time zones t1 and t2). At the third stage (time zone t3), the axial inner end portion is in contact with the axial inner surface of the internal inner race 22*a* to a degree that the inner race track 11*a* of the inner row in the axial direction is not deformed. At a fourth stage (time zone t4), the axial inner end portion is in contact with the axial inner surface of the internal inner race 22*a* to a degree that the inner race track 11*a* of the inner row in the axial direction is deformed.

In this embodiment, swaging in the first step ends in any one of the first to third stages (time zones t1, t2, and t3) while confirming the forming rotation torque $T_s$. However, it is preferable to ensure a certain amount of processing the axial inner end portion of the hub body 21 in the first step from the viewpoint of improving the efficiency of the work for forming the staking portion 26. Therefore, it is preferable that a time point that ends swaging in the first step is any one of the second stage (time zone t2) and the third stage (time zone t3) rather than the first stage (time zone t1). As a detailed end time point in this case, for example, a time point immediately after the transition to the second stage (time zone t2) or a time point immediately after the transition to the third stage (time zone t3) is exemplified. Here, a time point immediately after the transition to the second stage (time zone t2) is a time point (for example, a point Q1 in FIG. 4) in which the forming rotation torque $T_s$ first settles to an almost constant value after the start of swaging. Further, a time point immediately after the transition to the third stage (time zone t3) is a time point (for example, a point Q2 in FIG. 4) in which the forming rotation torque $T_s$ first settles to an almost constant value after the start of swaging and the forming rotation torque T starts to decrease.

In this embodiment, swaging in the first step is performed while measuring the axial load $P_1$ applied from the first forming die 30 to the axial inner end portion of the hub body 21, the forming rotation torque $T_s$ for swinging and rotating the first forming die 30, and the movement speed $V_s$ of the first forming die 30 in the axial direction. Additionally, the axial load $P_1$ can be measured based on, for example, a hydraulic pressure of a hydraulic mechanism (not shown) for moving the first forming die 30 in the axial direction. Further, the movement speed $V_s$ can be measured by using, for example, a linear scale (not shown).

In this embodiment, the information for each of the axial load $P_1$, the forming rotation torque $T_s$, and the movement speed $V_s$ at a time point in which swaging in the first step ends is adopted as three pieces of information included in the information $I_B$ acquired in the first step. Additionally, the information $I_B$ can include another information instead of or in addition to the above-described information.

(Second Step of Staking Portion Forming Step)

In the second step, first, the axial load $P_{2x}$ applied to the axial inner end portion of the hub body 21 and required to bring a preload closer to the target value is determined by using the information $I_A$ acquired in the step before the staking portion forming step and the information $I_B$ acquired in the first step. In an example, specifically, the axial load $P_{2x}$ is calculated by using the following formula (1). In the formula (1), the axial load $P_{2x}$ is the dependent variable. Further, in the formula (1), each information (the fitting allowance S, the bearing axial gap $\Delta a$, and the press-fitting load $F_p$) included in the information $I_A$, each information (the axial load $P_1$, the forming rotation torque $T_s$, and the movement speed $V_s$) included in the information $I_B$, and the target value X of the preload are included in the independent variables.

$$P_{2x}=k_1 \times S+k_2 \times \Delta a+k_3 \times F_p+k_4 \times P_1+k_5 \times T_s+k_6 \times V_s+k_7 \times X \quad (1)$$

Here, $k_1$, $k_2$, $k_3$, $k_4$, $k_5$, $k_6$, and $k_7$ are coefficients. These coefficients are obtained in advance by multiple regression analysis. These coefficients can also be obtained by various experiments and simulations other than multiple regression analysis.

Further, in the formula (1), the target value X of the preload can be set to an arbitrary value. Further, in the hub unit bearing 1, the outer race rotation torque $T_g$ which is a torque for rotating the outer race 2 with respect to the hub 3 has a magnitude corresponding to the preload. Therefore, in the formula (1), the target outer race rotation torque $T_{gx}$ which is the outer race rotation torque $T_g$ corresponding to the target value of the preload can be input to the target value X of the preload. Additionally, the outer race rotation torque $T_g$ can be measured based on a current value of an electric motor for an outer race (not shown) rotating the outer race 2 with respect to the hub 3.

As described above, the axial load $P_{2x}$ applied to the axial inner end portion of the hub body 21 and required to bring a preload closer to a target value is calculated. Next, the staking portion intermediate body 39 is processed into the staking portion 26 by the axial load $P_{2x}$. In an example, the staking portion 39 is formed between the first step and the second step by using different construction methods and/or different devices. Next, this point will be described in detail.

Figure 5A:
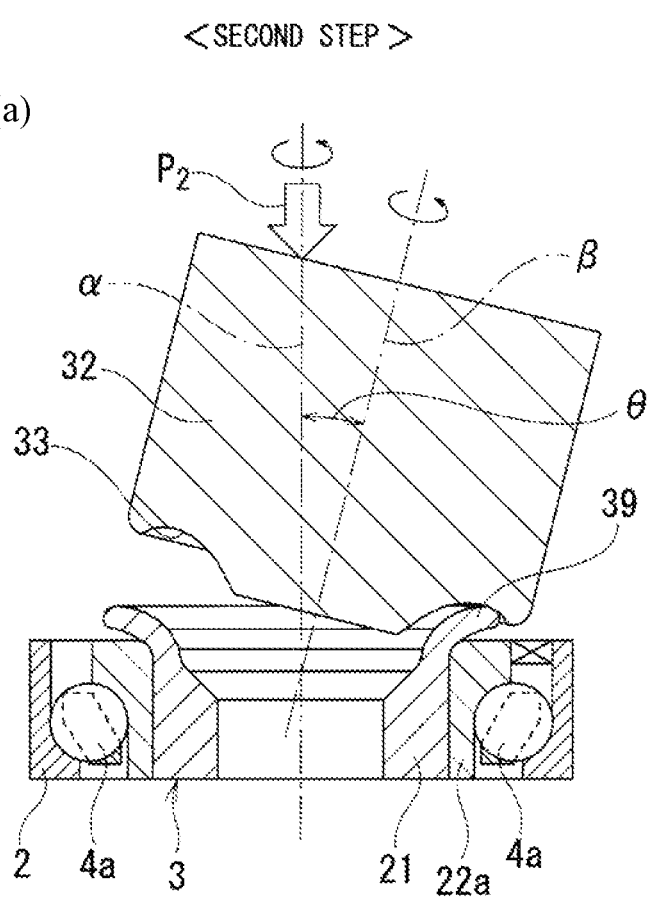
FIG. 5(a) is a partially cross-sectional view showing a start state of a second step of the staking portion forming step of the first embodiment and FIG. 5(b) is a partially cross-sectional view showing an end state of the second step.
Figure 5B:
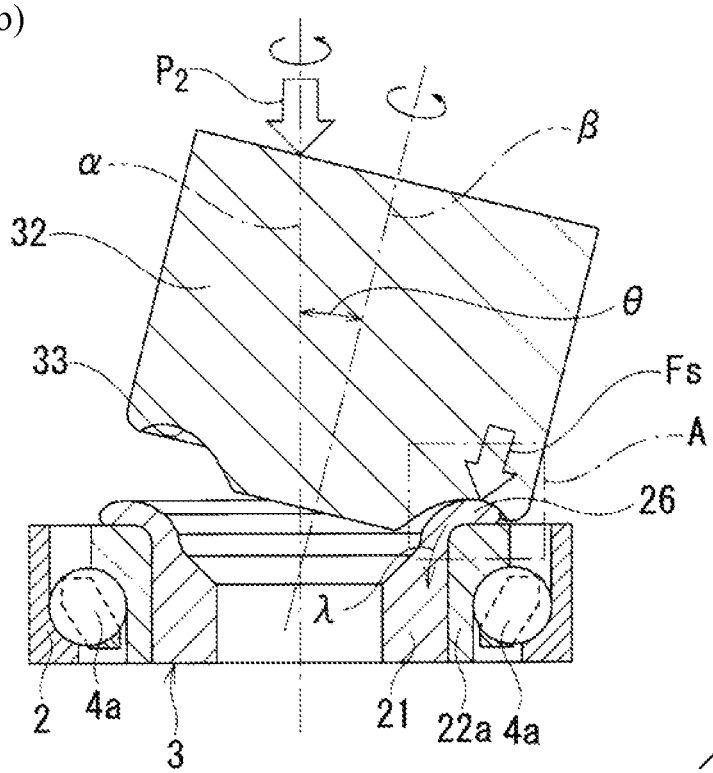

In the second step, the staking portion intermediate body 39 is processed into the staking portion 26 by swaging using a device different from the first staking device used in the first step, specifically, a second staking device including a second forming die 32 shown in FIG. 5(a) and FIG. 5(b). That is, as shown in FIG. 5(a) and FIG. 5(b), the staking portion 26 is formed by pressing a processing surface portion 33 of the second forming die 32 swinging and rotating about the center axis α of the hub 3 against the axial inner end portion of the hub body 21 (the staking portion intermediate body 39) while preventing the displacement of the hub body 21 and rotating the outer race 2 with respect to the hub 3.

When forming the staking portion 26 by such swaging, the axial load $P_2$ applied from the second forming die 32 to the axial inner end portion of the hub body 21 is gradually increased. Accordingly, the shape of the axial inner end portion of the hub body 21 is brought closer to the shape of the staking portion 26 after completion by advancing the downward movement of the second forming die 32. Further, in this example, at this time, the upper limit value of the axial load $P_2$ is set to be the axial load $P_{2x}$ in advance. Therefore, for example, in a hydraulic mechanism (not shown) for moving the second forming die 32 in the axial direction, the control valve is set so that the value of the hydraulic pressure for generating the axial load $P_2$ does not become larger than the value corresponding to the axial load $P_{2x}$. As a result, in this example, at a time point in which the axial load $P_2$ reaches the axial load $P_{2x}$, the increase of the axial load $P_2$ stops and at the same time, the downward movement of the second forming die 32 stops. Then, if necessary, the swinging rotation of the second forming die 32 is continued for a predetermined time and swaging in the second step ends. By the work of forming such a staking portion 26, the preload is increased so that the preload is brought closer to the target value.

Figure 6:
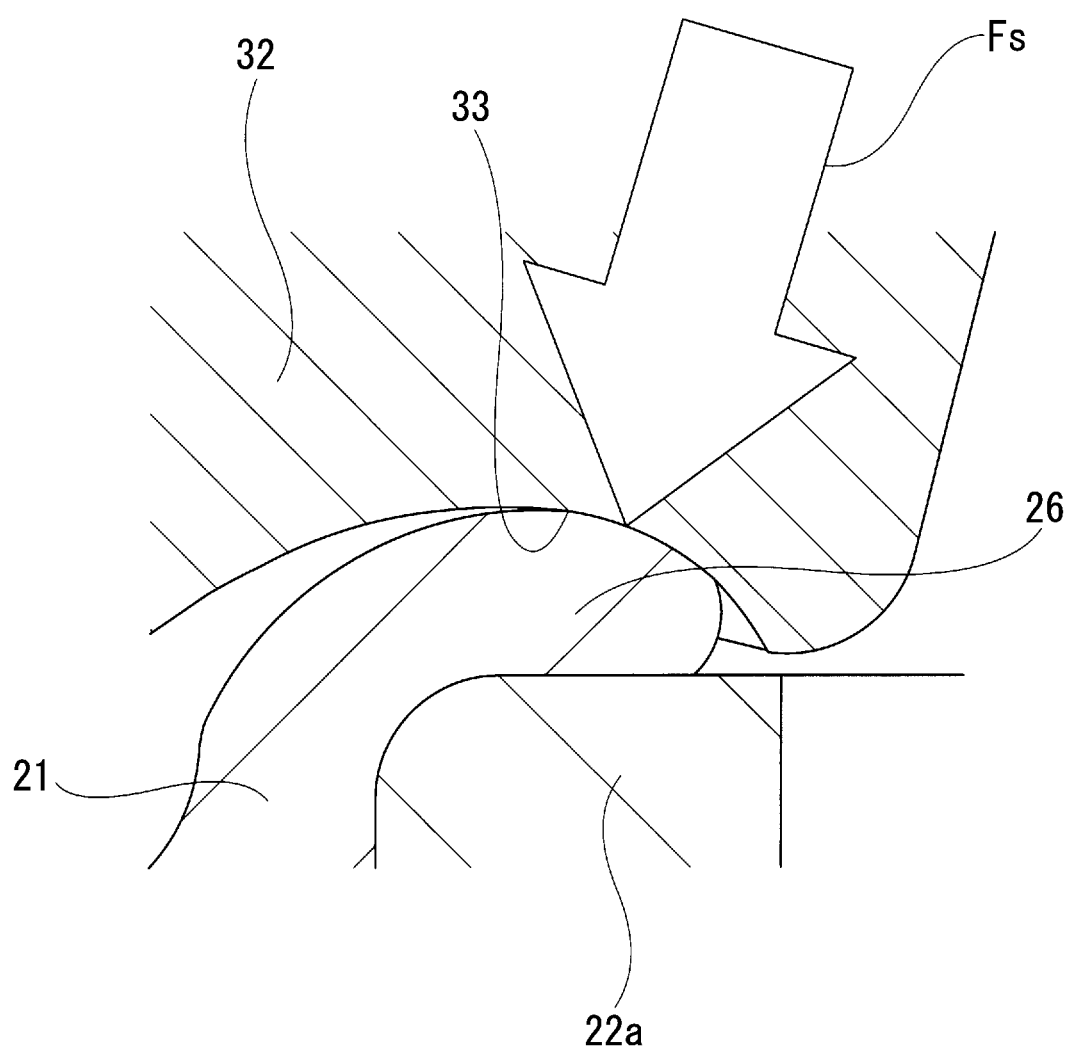
FIG. 6 is an enlarged view of a part A of FIG. 5(b).

Further, in this embodiment, the processing surface portion 33 of the second forming die 32 has a shape in which a processing force $F_s$ directed downward in the up and down direction and inward in the radial direction is applied to the staking portion 26 in the final stage of swaging shown in FIG. 5(b) (see FIG. 6). In other words, the processing surface portion 33 of the second forming die 32 has a concave curved surface shape in which a portion pressing the staking portion 26 is inclined downward in the up and down direction as it goes outward in the radial direction in the final stage of swaging shown in FIG. 5(b).

In this way, in this embodiment, a processing force F directed downward in the up and down direction and inward in the radial direction is applied from the processing surface portion 33 of the second forming die 32 to the staking portion 26 in the final stage of swaging of the second step. Accordingly, as indicated by an arrow X in FIG. 5(b), a material escapes from the staking portion 26 to the inner radial side of the fitting surface portion 23 so that a large force of an axial component is applied from the staking portion 26 to the internal inner race 22a. Accordingly, it is possible to prevent an excessive force directed outward in the radial direction from being applied from the staking portion 26 to the internal inner race 22a and prevent inconveniences such as deterioration of the shape accuracy of the inner race track 11a of the axial inner row.

Additionally, in another example, the staking portion 39 is formed by using the same construction methods or devices as those of the first step and the second step. For example, it is possible to use the forming die having the same shape as those of the first step and the second step. In this case, when a swing angle θ which is an inclination angle of the rotation axis of the forming die with respect to the center axis of the hub is set to be larger in the second step than the first step, a processing force directed downward in the up and down direction and inward in the radial direction can be applied from the processing surface portion of the forming die to the staking portion in the final stage of swaging of the second step. Alternatively, the swing angle and the swing center can be the same in the first step and the second step.

As described above, according to the hub unit bearing manufacturing method of this embodiment, the preload can be adjusted, specifically, the preload can be brought closer to the target value.

Further, in this embodiment, the staking portion 26 is formed in the first step and the second step and the first step and the second step are performed by using different staking devices. Therefore, the production efficiency of the hub unit bearing 1 can be increased. That is, when the work of forming the staking portion 26 is performed by the first step and the second step, the staking time per step can be shortened and the staking process of the first step of the next hub unit bearing can be started while performing the staking process of the subsequent second step after the staking process of the first step ends. Thus, the production efficiency of the hub unit bearing 1 can be increased accordingly. Forming the staking portion 39 by using different construction methods and/or different devices between the first step and the second step is advantageous for setting processing conditions respectively suitable for, for example, the first step and the second step. Forming the staking portion 39 by using the same construction methods and/or the same devices as those of the first step and the second step is advantageous for, for example, the simple processing system.

Second Embodiment

A second embodiment of the present invention will be described with reference to FIGS. 7 to 10.

Also in the second embodiment, the staking portion forming step of forming the staking portion 26 includes the first step and the second step. The first step is a step of processing the cylindrical portion 25 provided at the axial inner end portion of the hub body 21 before forming the staking portion 26 into the staking portion intermediate body 39 (see FIG. 3(a) and FIG. 3(b)). The second step is a step of processing the staking portion intermediate body 39 into the staking portion 26 (see FIG. 5(a) and FIG. 5(b)).

Unlike the first embodiment, in the second embodiment, swaging in the second step is performed in a plurality of stages. Further, the outer race rotation torque $T_g$ is measured after swaging in each stage ends. Further, in each stage after the second stage, the axial load $P_2$ applied to the axial inner end portion of the hub body 21 is determined by using the information of the outer race rotation torque $T_g$ measured after swaging of the precedent stage ends. Accordingly, a preload is adjusted. That is, in the second embodiment, the preload is adjusted while confirming the outer race rotation torque $T_g$ changing in response to the magnitude of the preload.

(First Step of Staking Portion Forming Step)

Figure 7:
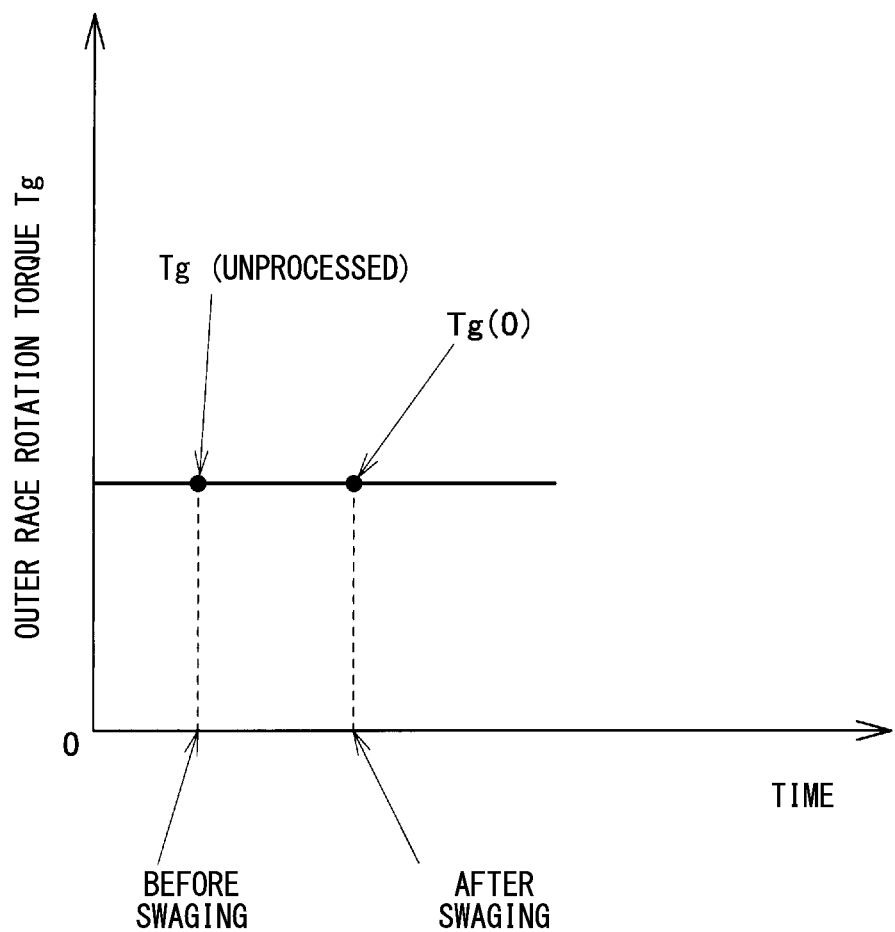
FIG. 7 is a diagram showing a state in which a forming rotation torque $T_s$ does not change before and after a staking process in a first step of a staking portion forming step of a second embodiment.

In this embodiment, it is confirmed that the preload does not substantially change before and after swaging in the first step, that is, before and after the cylindrical portion 25 of the hub body 21 is processed into the staking portion intermediate body 39. Therefore, specifically, each of the outer race rotation torque $T_g$ (unprocessed) at a time point before swaging in the first step and the outer race rotation torque $T_g$ (0) at a time point after swaging in the first step is measured. Even when the measured outer race rotation torques $T_g$ (unprocessed) and $T_g$ (0) at a time points before and after swaging in the first step are substantially the same magnitudes ($T_g$ (unprocessed)≈$T_g$(0)), in other words, both magnitudes are different from each other as shown in FIG. 7, it is confirmed that this difference enters an allowed range. If such confirmation is possible, the process proceeds to the subsequent second step.

(Second Step of Staking Portion Forming Step)

In the second step, swaging for processing the staking portion intermediate body 39 into the staking portion 26 is performed in a plurality of stages. In such a second step, the axial load $P_2$ (1) when performing swaging in the first stage is adjusted so that the outer race rotation torque $T_g$ becomes smaller than the target outer race rotation torque $T_{gx}$ after swaging in the first stage ends. Additionally, the target outer race rotation torque $T_{gx}$ is the outer race rotation torque $T_s$ in a state in which a preload becomes a target value and is determined to be the same size for the same type of products to be produced.

Figure 8:
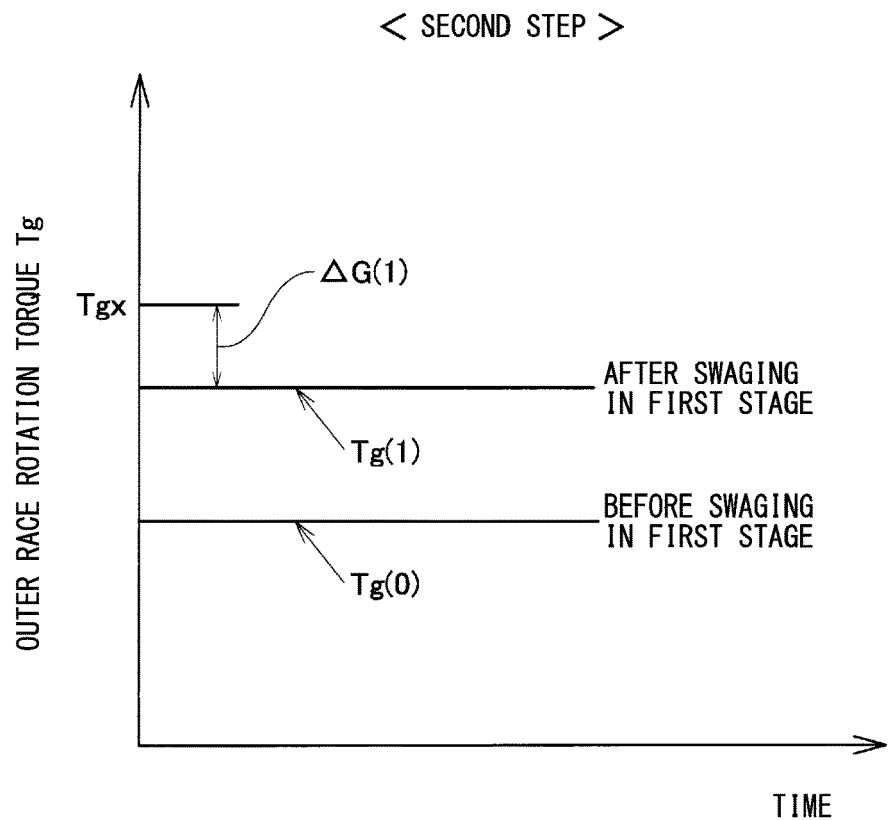
FIG. 8 is a diagram illustrating a case in which an outer race rotation torque $T_g$ is measured after performing a staking process of a first stage in a second step of the staking portion forming step of the second embodiment.

When performing swaging in the first stage of the second step, the upper limit value of the axial load $P_2$ applied from the second forming die 32 to the axial inner end portion of the hub body 21 is set to be the axial load $P_2$ (1). When swaging in the first stage starts after such setting is made, the axial load $P_2$ gradually increases. Accordingly, the downward movement of the second forming die 32 is advanced, so that the shape of the axial inner end portion of the hub body 21 approaches the shape of the staking portion 26 after completion. Then, the increase of the axial load $P_2$ stops at a time point in which the axial load $P_2$ reaches the axial load $P_2$ (1) and at the same time, the downward movement of the second forming die 32 stops. Then, if necessary, the swing rotation of the second forming die 32 is continued for a predetermined time and then swaging in the first stage ends. Then, the second forming die 32 is retracted to the upper side of the axial inner end portion of the hub body 21 after swaging ends and the outer race rotation torque $T_g$(1) is measured. Then, as shown in FIG. 8, the difference between the measured value $T_g$(1) and the target outer race rotation torque $T_{gx}$ is obtained as $\Delta G$ (1)=$T_{gx}$-$T_g$(1).

Figure 9:
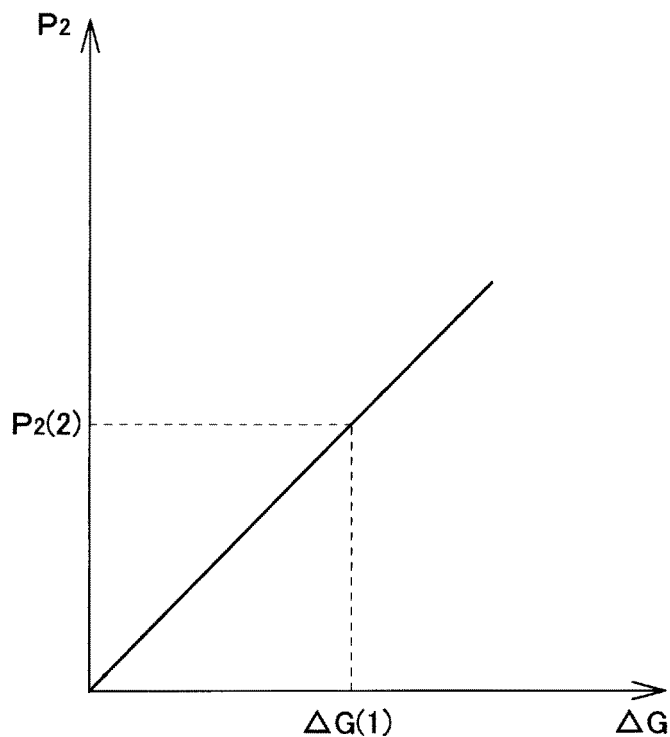
FIG. 9 is a diagram showing a load condition when performing a staking process from a second stage used in the second step of the staking portion forming step of the second embodiment.

Further, in this embodiment, a relationship shown in the diagram of FIG. 9, that is, a relationship with the axial load $P_2$ (the value of the horizontal axis of the diagram of FIG. 9) when performing swaging in the next stage is obtained in advance by an experiment or simulation. This relationship is necessary for bringing the difference $\Delta G$=$T_{gx}$-$T_g$ (the value of the horizontal axis of the diagram of FIG. 9) closer to zero when the value of the outer race rotation torque $T_g$ (for example, $T_g$ (1)) at the current time point is smaller than the value of the target outer race rotation torque $T_{gx}$. By using such a relationship, the axial load $P_2$ (2) when performing swaging in the second stage is obtained from the difference $\Delta G$ (1) obtained as described above.

Figure 10:
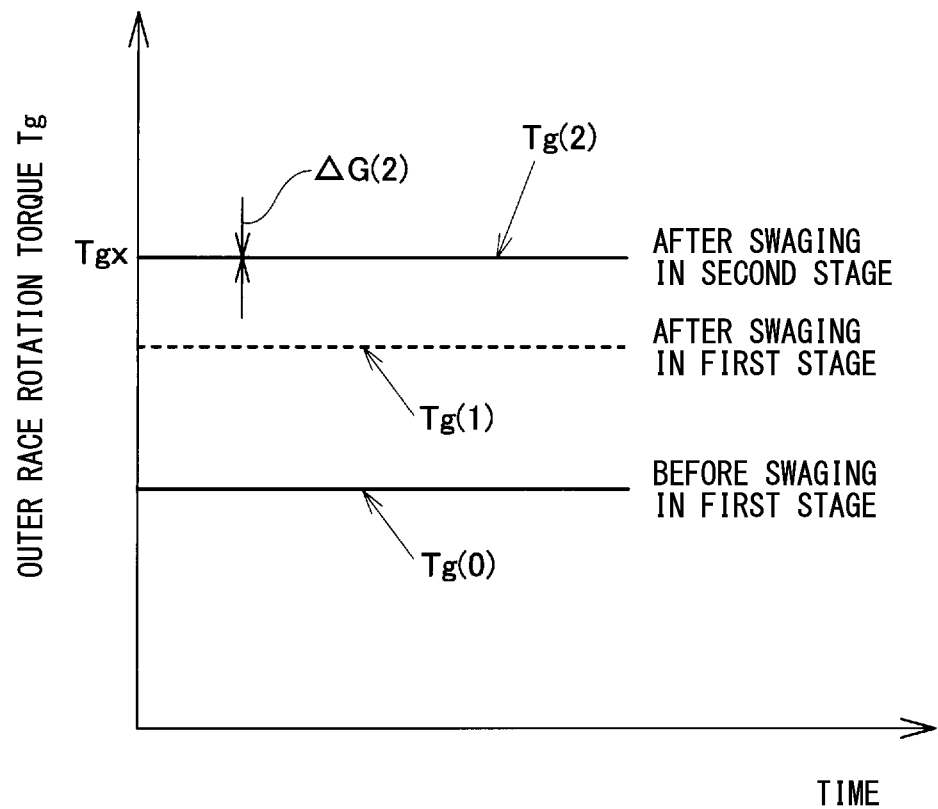
FIG. 10 is a diagram illustrating a case in which an outer race rotation torque $T_g$ is measured after performing a staking process of a second stage in the second step of the staking portion forming step of the second embodiment.

Swaging is performed similarly to the first stage by such an axial load $P_2$ (2), that is, the upper limit value of the axial load $P_2$ applied from the second forming die 32 to the axial inner end portion of the hub body 21 is set to be the axial load $P_2$ (2) and swaging in the second stage is performed. After swaging ends, the second forming die 32 is retracted to the upper side of the axial inner end portion of the hub body 21 and the outer race rotation torque $T_g$ (2) is measured. As shown in FIG. 10, it is confirmed that the measured value $T_g$(2) is sufficiently closer to the target outer race rotation torque $T_{gx}$, specifically, the difference between the measured value $T_g$ (2) and the target outer race rotation torque $T_{gx}$ which is $\Delta G$ (2)=$T_{gx}$-$T_g$ (2) is equal to or smaller than a predetermined threshold value.

Additionally, if the measured value $T_g$ (2) is smaller than the target outer race rotation torque $T_{gx}$ and the difference $\Delta G$ (2) between the measured value $T_g$(2) and the target outer race rotation torque $T_{gx}$ exceeds a predetermined threshold value, in other words, the preload does not enter an allowed range in the confirming work, a work of obtaining the axial load when performing swaging of the next stage using the relationship of FIG. 9 and a work of performing swaging by the obtained axial load are repeated until it is confirmed that the preload enters the allowed range.

Additionally, in this embodiment, it is possible to adopt a value obtained by multiplying a safety factor ε (for example, 0.9≤ε<1) less than 1 by the value of the axial load $P_2$ obtained by using the relationship of FIG. 9 as the value of the axial load when performing swaging after the second stage in the second step at the time of performing the manufacturing method. In this way, the outer race rotation torque $T_g$ can be sufficiently brought closer to the target outer race rotation torque $T_{gx}$ while preventing the outer race rotation torque $T_g$ after swaging after the second stage from being larger than the target outer race rotation torque $T_{gx}$.

As described above, in this embodiment, the preload can be adjusted, specifically, the preload can be brought closer to the target value. Other configurations and effects can be the same as in the first embodiment.

Third Embodiment

Figure 11:
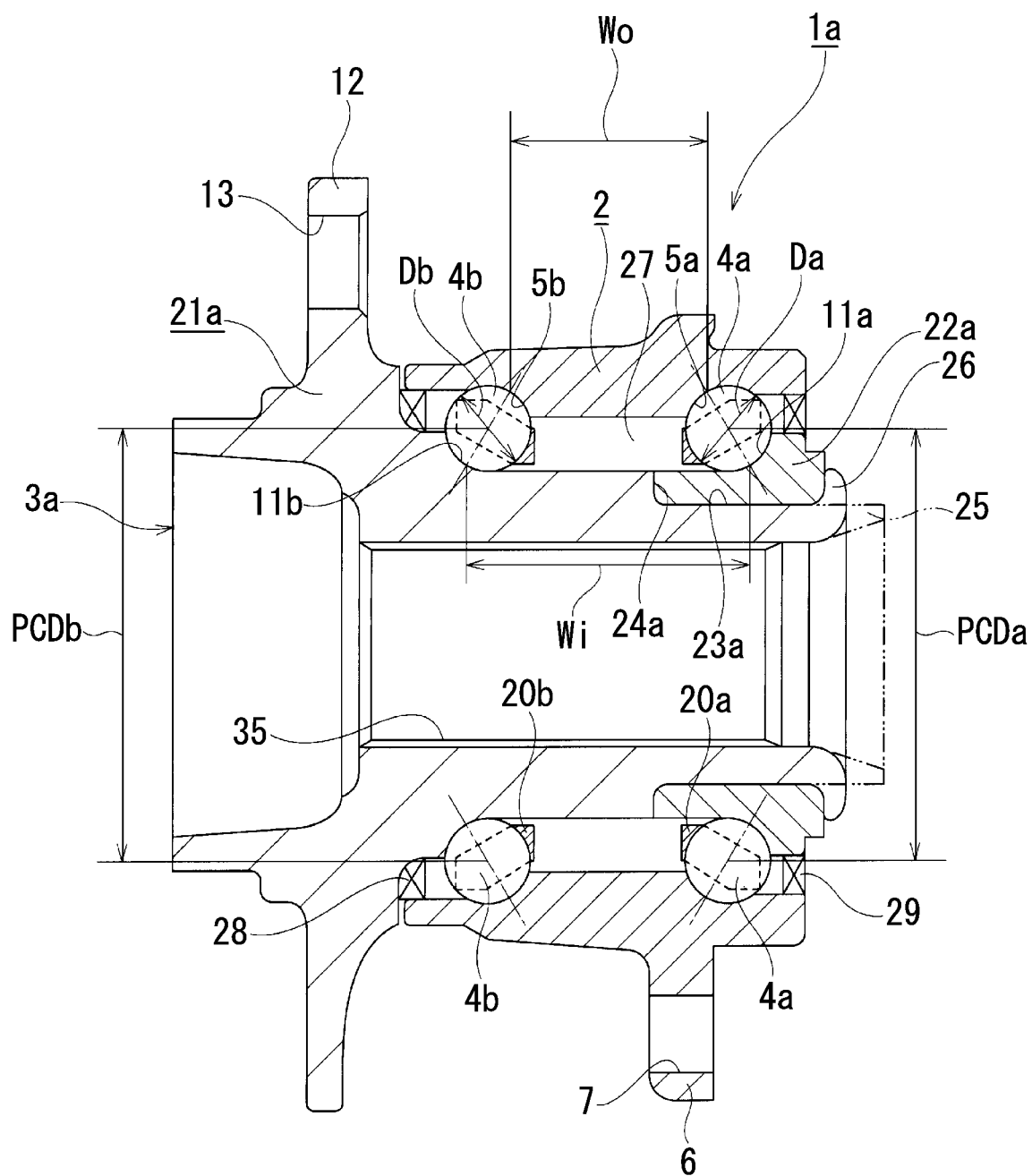
FIG. 11 is a cross-sectional view showing a hub unit bearing of a third embodiment.

A third embodiment of the present invention will be described with reference to FIG. 11.

In the third embodiment, in a hub unit bearing 1a to be manufactured, the inner race track 11b of the axial outer row is provided on the outer peripheral surface of the axial intermediate portion of the hub body 21a constituting the hub 3a as a comparison with the hub unit bearing 1 shown in FIG. 1. Further, the hub body 21a has a fitting surface portion 23a which is formed on the outer peripheral surface of the axial inner portion to have a diameter smaller than that of the inner race track 11b of the axial outer row and has a step surface 24a which is formed at the axial outer end portion of the fitting surface portion 23a to be directed inward in the axial direction. The internal inner race 22a having the inner race track 11a of the axial inner row on the outer peripheral surface is fitted to the fitting surface portion 23a by tightening and the axial outer surface is in contact with the step surface 24a. In this state, the axial inner surface of the internal inner race 22a is pressed by the staking portion 26 provided at the axial inner end portion of the hub body 21a. Further, since the hub unit bearing 1a is for a drive wheel, a spline hole 35 spline-engaging a drive shaft (not shown) is provided at the center portion of the hub body 21a.

The hub unit bearing 1a is assembled by, for example, the following procedure. First, the rolling element 4a of the axial inner row held by the cage 20a is disposed on the inside of the outer race track 5a of the axial inner row in the radial direction and the rolling element 4b of the axial outer row held by the cage 20b is disposed on the inside of the outer race track 5b of the axial outer row in the radial direction. Further, the sealing member 29 on the outside in the axial direction is attached to the outer race 2. Next, the axial intermediate portion and the inner portion of the hub body 21a before forming the staking portion 26 are inserted to the inside of the outer race 2 in the radial direction. Next, the internal inner race 22a is press-fitted to the fitting surface portion 23a so that the axial outer surface of the internal inner race 22a is in contact with the step surface 24a. After assembling the hub unit bearing 1a before forming such a staking portion 26, the staking portion 26 is formed. Additionally, the sealing member 29 on the inside in the axial direction is attached after forming the staking portion 26.

Further, a certain degree of a preload is applied to the hub unit bearing 1a in an assembled state before forming the staking portion 26, that is, an assembled state in which the axial outer surface of the internal inner race 22a is in contact with the step surface 24a as described above and the axial inner surface of the internal inner race 22a is pressed by the staking portion 26 to be formed later, so that the preload increases.

In this embodiment, the same method of processing the staking portion 26 as in the first example of the embodiment is performed in a state in which such a hub unit bearing 1a is a manufacturing target. In this embodiment, the information $I_A$ relating to a factor that affects the preload acquired in the step before the first step used in the second step of the staking portion forming step is set as the fitting allowance S between the fitting surface portion 23a and the internal inner race 22a, the press-fitting load $F_p$ of the internal inner race 22a with respect to the fitting surface portion 23a, and the bearing axial gap Δa in an assembled state before forming the staking portion 26.

However, when it is difficult to measure the bearing axial gap Δa in an assembled state before forming the staking portion 26, instead of the bearing axial gap Δa, for example, the inter-row width $W_o$ of the double-row outer race tracks 5a and 5b, the inter-row width $W_i$ of the double-row inner race tracks 11a and 11b, the diameters $D_a$ and $D_b$ of the rolling elements 4a and 4b of each row, and the pitch circle diameters $PCD_a$ and $PCD_b$ of the rolling elements 4a and 4b of each row are measured and these measured values can be adopted.

Additionally, the inter-row width $W_o$ of the double-row outer race tracks 5a and 5b is an axial distance between the center position of the contact portion between the outer race track 5a of the axial inner row and the rolling element 4a of the axial outer row and the center position of the contact portion between the outer race track 5b of the axial outer row and the rolling element 4b of the axial outer row. Further, the inter-row width $W_i$ of the double-row inner race tracks 11a and 11b is an axial distance between the center position of the contact portion between the inner race track 11a of the axial inner row and the rolling element 4a of the axial outer row and the center position of the contact portion between the inner race track 11b of the axial outer row and the rolling element 4b of the axial outer row.

Also in this embodiment, in the second step, the axial load $P_{2x}$ is first calculated by using a relational expression same as the formula (1). In order to bring a preload closer to a target value, this relational expression uses the axial load $P_{2x}$ applied to the axial inner end portion of the hub body 21a as a dependent variable and uses each information (the fitting allowance S, the press-fitting load $F_p$, the bearing axial gap Δa (or the inter-row width $W_o$, the inter-row width $W_i$, the diameters $D_a$ and $d_b$ of the rolling elements 4a and 4b, and the pitch circle diameters $PCD_a$ and $PCD_b$)) included in the information $I_A$, each information (the axial load $P_1$, the forming rotation torque $T_s$, and the movement speed $V_s$) included in the information $I_B$, and the target value of the preload X as independent variables. The staking portion intermediate body 39 is processed into the staking portion 26 by the axial load $P_{2x}$ calculated in this way.

Additionally, when performing swaging, the contact portion of the forming die with respect to the work moves in the circumferential direction in accordance with the swing rotation of the forming die, but the circumferential width of the contact portion becomes narrower as the swing angle θ of the forming die becomes larger. Accordingly, the plastic deformation region of the work in the periphery of the contact portion also becomes narrow. On the other hand, in the case of the hub unit bearing 1a for a drive wheel, the contact portion of the forming die with respect to the hub body 21a when forming the staking portion 26 is closer to the spline hole 35 in the second step than the first step. Therefore, particularly, in the second step, it is preferable to increase the swing angle θ of the second forming die 32 (see FIG. 5(a) and FIG. 5(b)) to a degree that the plastic deformation region of the hub body 21a when performing swaging does not reach the spline hole 35. Other configurations and effects can be the same as in the first embodiment.

Fourth Embodiment

Figure 12:
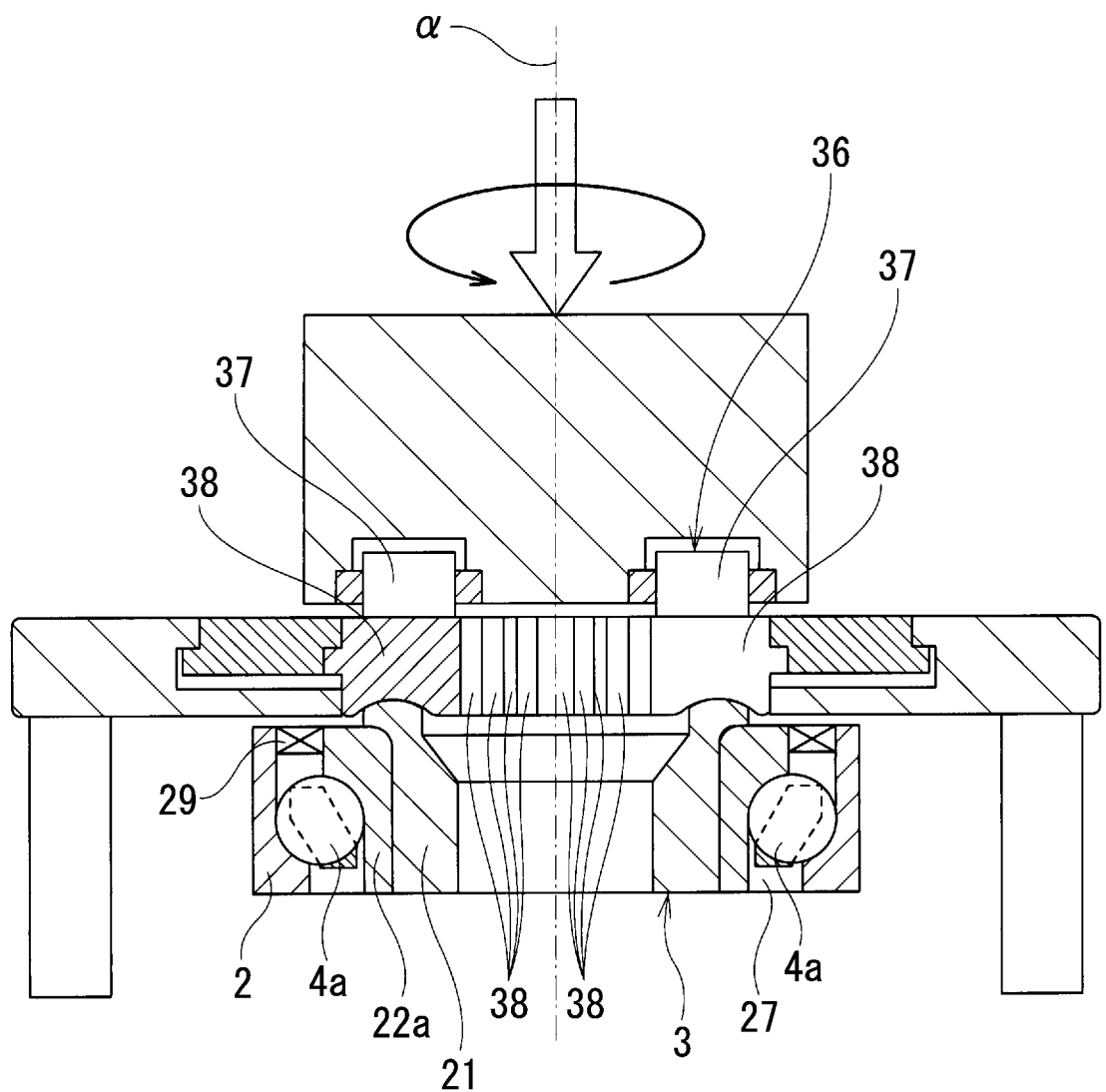
FIG. 12 is a partially cross-sectional view showing an end state of a second step of a staking portion forming step of a fourth embodiment.

A fourth embodiment of the present invention will be described with reference to FIG. 12.

In the fourth embodiment, in the method of manufacturing the hub unit bearing, a step of attaching the sealing member 29 closing the axial inner end opening of the inner space 27 existing between the inner peripheral surface of the outer race 2 and the outer peripheral surface of the hub 3 to a gap between the outer race 2 and the internal inner race 22a is performed before performing the second step of the staking portion forming step after performing the first step of the staking portion forming step. That is, in this embodiment, the second step of the staking portion forming step is performed while the sealing member 29 on the inside in the axial direction is attached between the outer race 2 and the internal inner race 22a.

Further, in this embodiment, a second staking device including a forming die 36 and a plurality of rollers 37 shown in the drawings is used in the second step of the staking portion forming step. The forming die 36 is disposed above the hub body 21. Further, the forming die 36 is obtained by combining a plurality of forming die elements 38 which are arranged in the circumferential direction about the center axis α of the hub body 21 and are independent from each other to be movable in the up and down direction. The plurality of rollers 37 are disposed above the forming die 36. Further, the roller 37 is disposed at a plurality of positions to be smaller than the total number of the forming die elements 38 in the circumferential direction about the center axis α of the hub body 21. More specifically, the roller 37 is disposed at a plurality of rotationally symmetric positions about the center axis α of the hub body 21. Particularly, in this example, the roller 37 is disposed at a plurality of positions at an equal interval in the circumferential direction about the center axis α about the hub body 21.

When performing the staking process of the second step, that is, the second staking process for forming the staking portion 26, the plurality of rollers 37 are transferred in the circumferential direction about the center axis α of the hub body 21 while the lower surface of the forming die 36 is in contact with the axial inner portion of the hub body 21 and the plurality of rollers 37 are pressed against the upper surface of the forming die 36. Accordingly, the plurality of rollers 37 are sequentially pressed against the upper surface of the forming die element 38 and the lower surface of the forming die element 38 is sequentially pressed against the axial inner portion of the hub body 21 to plastically deform the axial inner portion of the hub body 21 outward in the radial direction, so that the staking portion 26 is formed.

When forming the staking portion 26 in this way, a processing force applied from the forming die 36 to the axial inner portion of the hub body 21 is always present at a plurality of rotationally symmetric positions about the center axis α of the hub body 21. Therefore, it is possible to form the staking portion 26 without substantially applying an unbalanced load to the axial inner portion of the hub body 21. Thus, it is possible to easily prevent a force applied from the staking portion 26 to the internal inner race 22a from being biased in the circumferential direction after forming the staking portion 26.

Further, in this embodiment, since the second step is performed while the sealing member 29 closing the axial inner end opening of the inner space 27 is attached, it is possible to prevent foreign matter from entering the inner space 27 from the outside through the axial inner end opening of the inner space 27 when performing the second step. Further, in this embodiment, since an unbalanced load is not substantially applied to the axial inner portion of the hub body 21 when forming the staking portion 26, it is possible to prevent the internal inner race 22a from being displaced in the radial direction with respect to the outer race 2 during the formation of the staking portion 26 and to prevent the damage of the sealing member 29. Additionally, it is possible to perform the second step without attaching the sealing member 29 when implementing the present invention. Other configurations and effects can be the same as in the first embodiment.

The present invention can be implemented by appropriately combining the above-described embodiments as long as there is no contradiction.

For example, the second embodiment and the fourth embodiment can be implemented in combination. Specifically, as in the fourth embodiment, a step of attaching the sealing member on the inside in the axial direction is performed between the first step and the second step of the staking portion forming step. Further, in the second step, when a method of processing the staking portion intermediate body into the staking portion while applying a load to a plurality of rotationally symmetric positions about the center axis of the hub body in the axial inner end portion of the hub body, a preload can be adjusted as in the second embodiment. Additionally, in this case, the outer race rotation torque $T_{sg}(0)$ at a time point in which a step of attaching the sealing member on the inside in the axial direction ends becomes larger than the outer race rotation torque $T_g(0)$ at a time point in which the first step ends by the sealing torque (sliding resistance) of the sealing member. Here, in this case, when each outer race rotation torque used in the second step is changed to a value in consideration of the sealing torque such that the outer race rotation torque $T_g(0)$ before processing in the first stage in FIGS. 8 and 10 is changed to $T_{sg}(0)$ or the data of FIG. 9 is set to a relationship after the attachment of the sealing member, a preload can be appropriately adjusted as described in the second embodiment.

Additionally, in an embodiment, each of the information included in the information $I_B$ acquired in the first step and the information included in the information $I_A$ acquired in the step before the staking portion forming step used in the second step of the staking portion forming step can be selected as appropriate information. Further, in the second step, only one of the information $I_A$ and the information $I_B$ can be used.

In an embodiment, various methods known from the past can be used as the method of performing the staking process on the axial inner end portion of the hub body to form the staking portion. Further, as the method of preventing the unbalanced load from being applied to the axial inner end portion of the hub body when forming the staking portion, for example, a method of staking while pressing the forming die around the entire circumference of the axial inner end portion of the hub body or the methods described in Japanese Patent Application Publication No. 2017-18991 (Patent Literature 2), Japanese Patent Application Publication No. 2017-67254 (Patent Literature 3), and Japanese Patent Application Publication No. 2017-106510 (Patent Literature 4) can be adopted.

In an embodiment, as shown in FIGS. 5(b) and 6, the method of applying a processing force directed downward in the up and down direction and inward in the radial direction from the processing surface portion of the forming die to the staking portion in the final stage of the staking process of the second step is not limited to the staking device for performing swaging. For example, the method of applying a processing force to the staking portion can be also applied to other staking devices such as a staking device shown in FIG. 12.

In an embodiment, it is possible to adopt a method of forming a face spline which is an uneven portion in the circumferential direction on the axial inner surface of the staking portion at the same time as forming the staking portion in the second step of the staking portion forming step.

In an embodiment, the method of manufacturing the staking assembly includes the steps of: combining the first member (21, 21a) with the second member (22a, 22b) having the hole (120) into which the first member (21, 21a) is inserted in the axial direction and applying an axial load to the shaft end of the first member (21, 21a) so that the staking portion (39, 26) for the second member (22a, 22b) is formed in the first member (21, 21a), this step including a step of adjusting the load based on at least one of (a) first information acquired before applying the load and (b) second information acquired while applying the load.

In an example, the first information includes information relating to the combination of the first member (21) and the second member (22a, 22b) and the second information includes information relating to physical characteristics of the first member (21, 21a).

For example, the first information includes information measured when combining the first member (21, 21a) with the second member (22a, 22b).

In an example, the staking portion (39, 26) is formed by temporarily using at least swaging.

In an example, the step of forming the staking portion (39, 26) includes a first step of forming the intermediate staking portion (39) by a predetermined load and a second step of forming the staking portion (26) by applying the adjusted load to the intermediate staking portion (39).

In an example, the staking portion (39, 26) is formed by using different construction methods or different devices between the first step and the second step or the staking portion (39, 26) is formed by using the same construction method or the same device as those of the first step and the second step.

In an embodiment, the hub unit bearing (1, 1a) includes the outer race (2) having the outer race track (5a, 5b), the hub (3, 3a) having the inner race track (11a, 11b), and the plurality of rolling elements (4a, 4b) disposed between the outer race track (5a, 5b) and the inner race track (11a, 11b). The hub (3, 3a) includes the hub body (21, 21a) and the inner race (22a, 22b) disposed on the outside of the hub body (21, 21a) and held by the hub body (21, 21a). The method of manufacturing the hub unit bearing (1, 1a) includes the steps of: combining the hub body (21, 21a) with the inner race (22a, 22b) having the hole (120) into which the hub body (21, 21a) is inserted in the axial direction and applying an axial load to the shaft end of the hub body (21, 21a) so that the staking portion (39, 26) for the inner race (22a, 22b) is formed in the hub body (21, 21a), this step including a step of adjusting the load based on at least one of (a) first information acquired before applying the load and (b) second information acquired while applying the load.

Figure 13:
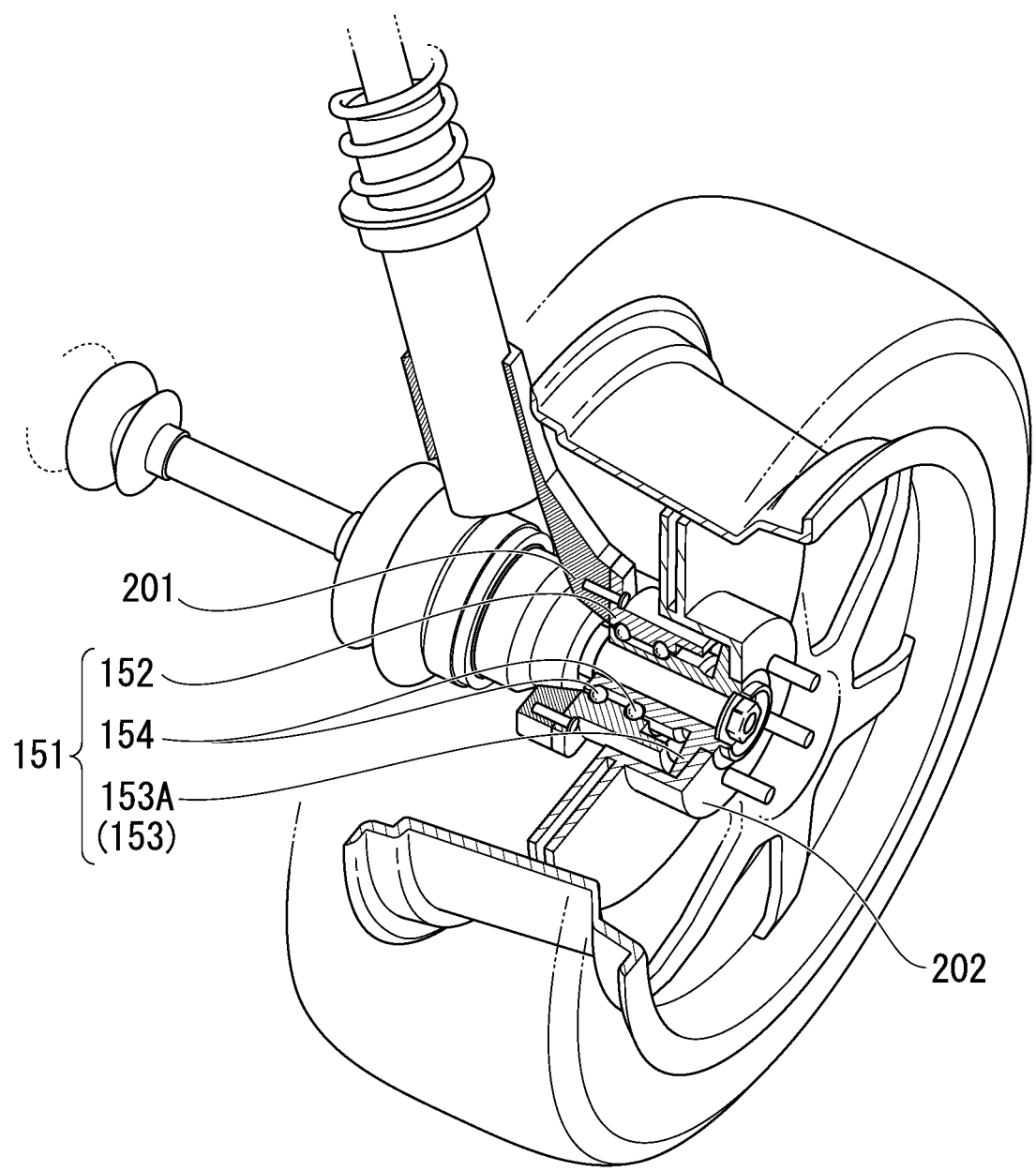
FIG. 13 is a partially schematic view of a vehicle including a hub unit bearing (a bearing unit).

FIG. 13 is a partially schematic view of a vehicle 200 including a hub unit bearing (bearing unit) 151. The present invention can be also applied to any one of a hub unit bearing for a drive wheel and a hub unit bearing for a driven wheel. In FIG. 13, the hub unit bearing 151 is used for a drive wheel and includes an outer race 152, a hub 153, and a plurality of rolling elements 156. The outer race 152 is fixed to a knuckle 201 of a suspension device using a bolt and the like. A vehicle wheel (and braking rotation body 22) 202 is fixed to a flange (rotational flange) 153A provided in the hub 153 using a bolt and the like. Further, the vehicle 200 can have the above-described support structure in the hub unit bearing 151 for a driven wheel.

The present invention is not limited to the hub of the hub unit bearing and can be also applied to other staking assembles (staking units) in which the first member and the second member having a hole into which the first member is inserted are combined in the axial direction.

REFERENCE SIGNS LIST 1, 1a Hub unit bearing
2 Outer race
3, 3a Hub
4a, 4b Rolling element
5a, 5b Outer race track
6 Stationary flange
7 Support hole
8 Knuckle
9 Through hole
10 Bolt
11a, 11b Inner race track
12 Rotational flange
13 Attachment hole
14 Braking rotation body
15 Stud
16 Through hole
17 Wheel
18 Through hole
19 Nut
20a, 20b Cage
21, 21a Hub body (hub race and first member)
22a Inner race (internal inner race and second member)
22b Inner race (external inner race and second member)
23, 23a Fitting surface portion
24, 24a Step surface
25 Cylindrical portion
26 Staking portion
27 Inner space
28 Sealing member
29 Sealing member
30 First forming die
31 Processing surface portion
32 Second forming die
33 Processing surface portion
34 Bearing assembly
35 Spline hole
36 Forming die
37 Roller
38 Forming die element
39 Staking portion intermediate body (intermediate staking portion)

What is claimed is:

1. A method of manufacturing a staking assembly, the method comprising:
  combining a first member with a second member having a hole into which the first member is inserted in an axial direction; and
  applying at least an axial load to a shaft end of the first member so that a staking portion for the second member is formed in the first member, with adjusting the axial load based on (a) first information acquired before applying the adjusted load and (b) second information acquired while applying the adjusted load, wherein the forming of the staking portion includes a first step of forming an intermediate staking portion by a predetermined load and a second step of forming the staking portion by applying the adjusted load to the intermediate staking portion, in the second step, a process for forming the staking portion from the intermediate staking portion is performed in a plurality of stages, and in each stage of the plurality of stages after a second stage of the plurality stages, the second step includes a process that determines, for each of the plurality of stages after the second stage, an updated adjusted load which is applied to the intermediate staking portion based on the second information acquired in a precedent stage.

2. The method of manufacturing the staking assembly according to claim 1, wherein the first information includes information relating to the combination of the first member and the second member, and wherein the second information includes information relating to physical characteristics of the first member.

3. The method of manufacturing the staking assembly according to claim 1, wherein the first information includes information measured when combining the first member with the second member.

4. The method of manufacturing the staking assembly according to claim 1, wherein the staking portion is formed by temporarily using at least a swaging method.

5. The method of manufacturing the staking assembly according to claim 1, wherein the staking portion is formed between the first step and the second step by using different methods or different devices or the staking portion is formed by the same methods or the same devices as those of the first step and the second step.

6. A method of manufacturing a hub unit bearing, the method comprising:

forming a staking portion, on a hub body, with respect to an inner race by using the method of manufacturing of a skating assembly of claim 1.

7. A method of manufacturing a vehicle including a hub unit bearing, the method comprising:

assembling the hub unit bearing to a wheel of the vehicle, wherein the hub unit bearing is manufactured by the method of manufacturing the hub unit bearing of claim 6.

* * * * *